United States Patent
Sawata et al.

(10) Patent No.: US 10,256,868 B2
(45) Date of Patent: Apr. 9, 2019

(54) CONTROL DEVICE UTILIZING SHORT RANGE COMMUNICATION TO DETECT MOVEMENT OF AN OBJECT AND DISPLAY INFORMATION ASSOCIATED WITH THE DETECTED MOVEMENT

(71) Applicant: Sharp Kabushiki Kaisha, Osaka (JP)

(72) Inventors: Yoshinari Sawata, Osaka (JP); Motohiro Kadowaki, Osaka (JP); Keiko Hirukawa, Osaka (JP); Sunao Yamaguchi, Osaka (JP); Michihiro Ohno, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/515,964

(22) PCT Filed: Oct. 1, 2015

(86) PCT No.: PCT/JP2015/077990
§ 371 (c)(1),
(2) Date: Mar. 30, 2017

(87) PCT Pub. No.: WO2016/052717
PCT Pub. Date: Apr. 7, 2016

(65) Prior Publication Data
US 2017/0302335 A1 Oct. 19, 2017

(30) Foreign Application Priority Data
Oct. 2, 2014 (JP) .................................. 2014-204175

(51) Int. Cl.
*H04B 5/00* (2006.01)
*H04B 5/02* (2006.01)
(Continued)

(52) U.S. Cl.
CPC ........... *H04B 5/0031* (2013.01); *G06F 3/046* (2013.01); *G06F 3/0487* (2013.01); *G06F 3/147* (2013.01);
(Continued)

(58) Field of Classification Search
CPC ..... H04W 4/008; H04W 4/021; H04W 4/023; H04W 4/025; A47F 10/06; A47F 10/02;
(Continued)

(56) References Cited

U.S. PATENT DOCUMENTS 6,791,452 B2 * 9/2004 Fletcher ................. G01B 7/004
340/10.1
7,316,615 B2 * 1/2008 Soltys ................ G06Q 10/0639
463/1
(Continued)

FOREIGN PATENT DOCUMENTS

JP 2009-214460 A 9/2009
JP 2011-175626 A 9/2011
(Continued)

*Primary Examiner* — Devan A Sandiford
(74) *Attorney, Agent, or Firm* — ScienBiziP, P.C.

(57) ABSTRACT

A predetermined process is executed in accordance with a state of a detection target which has been detected through short range communication with the detection target. In a case where a control device (100) has determined that a location of an NFC tag (30) detected by a display device (10) had changed, the control device (100) causes the display device (10) to transmit predetermined information to the communication terminal (20) via an NFC antenna (11).

1 Claim, 20 Drawing Sheets

(51) Int. Cl.
  *G06F 3/147* (2006.01)
  *G06F 3/0487* (2013.01)
  *H04W 4/02* (2018.01)
  *G06F 3/046* (2006.01)
  *G06Q 50/12* (2012.01)
  *G09G 5/00* (2006.01)

(52) U.S. Cl.
  CPC ............... *G06Q 50/12* (2013.01); *G09G 5/00* (2013.01); *H04B 5/02* (2013.01); *H04W 4/02* (2013.01); *G09G 2354/00* (2013.01); *G09G 2358/00* (2013.01)

(58) Field of Classification Search
  CPC .. A47F 9/00; A47F 5/0025; A47F 9/02; A47F 9/04; A47F 9/045; A47F 9/046; A47F 2009/041; A47F 2010/005; G08B 7/068; G06F 3/0481; G06F 3/0487
  See application file for complete search history.

(56) References Cited

U.S. PATENT DOCUMENTS

| | | | | |
|---|---|---|---|---|
| 7,390,256 | B2* | 6/2008 | Soltys | A63F 1/18 463/12 |
| 7,471,209 | B2* | 12/2008 | Hart | G06F 3/01 340/524 |
| 7,690,996 | B2* | 4/2010 | Iddings | G07F 17/32 463/10 |
| 7,704,144 | B2* | 4/2010 | Abbott | G07F 17/32 463/11 |
| 7,719,424 | B2* | 5/2010 | Steil | A63F 3/00157 235/376 |
| 7,727,060 | B2* | 6/2010 | Mills | A63F 1/00 273/292 |
| 8,157,652 | B2* | 4/2012 | Nguyen | G07F 17/32 273/309 |
| 8,358,286 | B2* | 1/2013 | Cannon | A63F 13/02 345/174 |
| 8,512,151 | B1* | 8/2013 | Mkrtchyan | A63F 13/2145 273/237 |
| 8,517,383 | B2* | 8/2013 | Wallace | A63F 3/00643 235/435 |
| 8,540,569 | B2* | 9/2013 | Orlinsky | A63F 3/00643 273/236 |
| 8,593,255 | B2* | 11/2013 | Pang | G06K 7/10019 340/10.1 |
| 8,602,857 | B2* | 12/2013 | Morichau-Beauchant | A63F 3/00214 273/236 |
| 9,652,647 | B2* | 5/2017 | Hattori | A47F 10/02 |
| 9,716,533 | B2* | 7/2017 | Shimomura | H04B 5/0062 |
| 2001/0035815 | A1* | 11/2001 | Fletcher | G01B 7/004 340/10.6 |
| 2002/0147042 | A1* | 10/2002 | Vuong | G07F 1/06 463/40 |
| 2003/0064775 | A1* | 4/2003 | Fujimoto | A63F 1/18 463/16 |
| 2006/0175753 | A1* | 8/2006 | MacIver | A63F 3/00643 273/237 |
| 2007/0176780 | A1* | 8/2007 | Hart | G06F 3/01 340/572.1 |
| 2008/0201212 | A1* | 8/2008 | Hammad | G06Q 20/045 705/13 |
| 2008/0303682 | A1* | 12/2008 | Han | G06F 1/1601 340/686.1 |
| 2009/0137204 | A1* | 5/2009 | Chang | H04B 5/00 455/41.1 |
| 2009/0231600 | A1 | 9/2009 | Hashimoto | |
| 2010/0004051 | A1* | 1/2010 | Walker | G07F 17/32 463/22 |
| 2010/0271177 | A1* | 10/2010 | Pang | G06K 7/10019 340/10.1 |
| 2010/0304841 | A1* | 12/2010 | Sammon | G07F 17/32 463/25 |
| 2011/0207401 | A1 | 8/2011 | Han et al. | |
| 2012/0252564 | A1* | 10/2012 | Moore | G07F 17/322 463/25 |
| 2015/0220266 | A1 | 8/2015 | Morimoto et al. | |
| 2015/0269516 | A1* | 9/2015 | Fukuda | G06Q 30/06 705/28 |
| 2016/0086005 | A1* | 3/2016 | Hattori | A47F 10/02 340/10.51 |
| 2016/0087693 | A1* | 3/2016 | Shimomura | A63F 13/34 340/10.1 |
| 2016/0187189 | A1* | 6/2016 | Camp | G01G 19/42 705/27.1 |
| 2016/0278091 | A1* | 9/2016 | Wang | G06F 3/167 |
| 2016/0351017 | A1* | 12/2016 | Moore | G07F 17/3293 |
| 2017/0337403 | A1* | 11/2017 | Ohno | G06K 7/10297 |
| 2018/0011671 | A1* | 1/2018 | Yamaguchi | G06F 3/14 |

FOREIGN PATENT DOCUMENTS

| | | |
|---|---|---|
| JP | 2011-180682 A | 9/2011 |
| JP | 2014-089501 A | 5/2014 |
| JP | 2014-206894 A | 10/2014 |
| WO | 2014/073137 A | 5/2014 |

* cited by examiner

| COMMUNICATION MODE | OVERVIEW |
|---|---|
| Reader/Writer | READ AND WRITE NFC TAG. |
| P2P | CARRY OUT COMMUNICATION BETWEEN NFC DEVICE. (SMARTPHONES CARRY OUT COMMUNICATION IN THIS MODE) |
| Card Emulation | OPERATE AS NFC TAG. |

(b)

Initiator          Target

Reader/Writer → Tag

Reader/Writer → Card Emulation

P2P → P2P

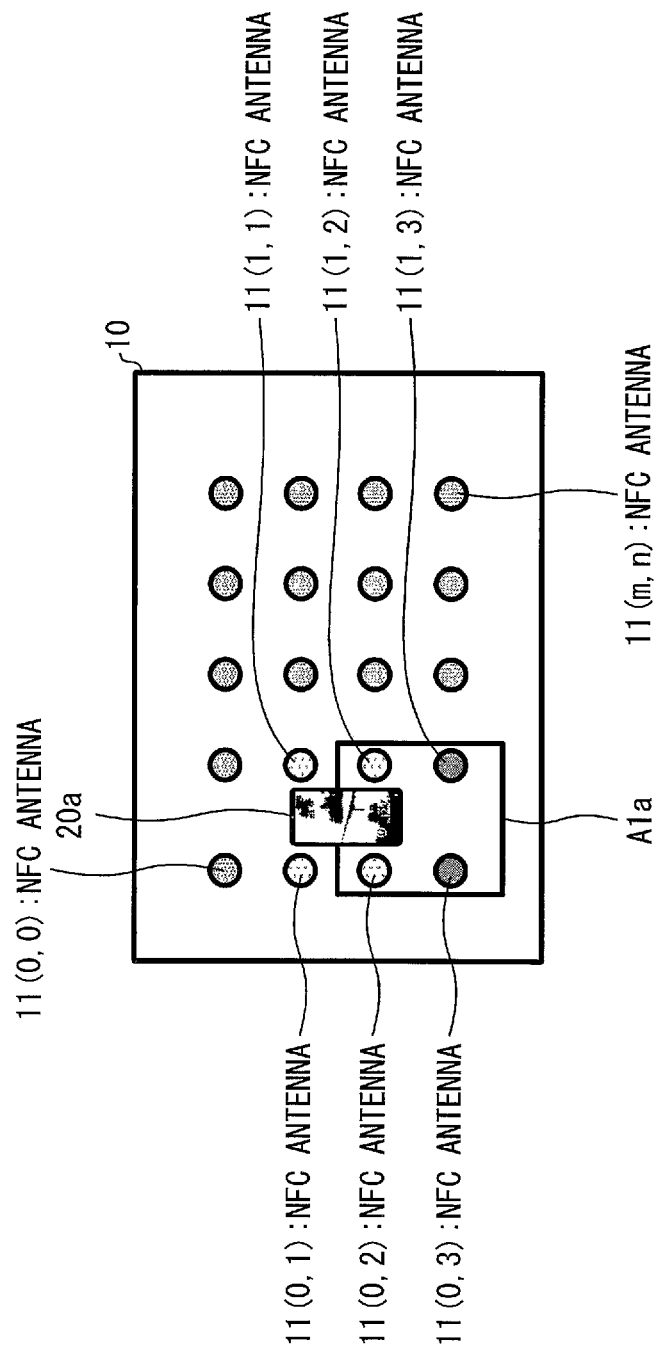

| ROW NO. | PROXIMITY/NON-PROXIMITY | COMMUNICATION MODE | NFC TAG IDENTIFICATION INFORMATION (TAG ID) | LOCATION INFORMATION CONTAINING TABLE ID | INTENSITY (10 IS HIGHEST AMONG 1 THROUGH 10) | TIME POINT |
|---|---|---|---|---|---|---|
| 1 | PROXIMITY | P2P | 20a | TABLE 1 (0, 1) |  | 15:45:00 |
| 2 | PROXIMITY | P2P | 20a | TABLE 1 (0, 2) | 4 | 15:46:00 |
| 3 | NON-PROXIMITY |  | 20a | TABLE 1 (0, 1) | 8 | 15:58:00 |
| 4 | NON-PROXIMITY |  | 20a | TABLE 1 (0, 2) |  | 15:58:30 |
| 5 | PROXIMITY | P2P | 20a | TABLE 1 (3, 0) | 10 | 15:59:00 |

(b)

| LOCATION INFORMATION CONTAINING TABLE ID | BELONGING AREA |
|---|---|
| TABLE 1 (0, 1) | A1a |
| TABLE 1 (0, 2) | A1a |
| ... | ... |
| TABLE 1 (3, 0) | A1b |
| ... | ... |
| TABLE 2 (0, 1) | A1a |
| ... | ... |

(c)

| NFC IDENTIFICATION INFORMATION (TAG ID) | FOOD INFORMATION |
|---|---|
| 30a | DRAFT BEER (GLASS 1) |
| 30b | DRAFT BEER (GLASS 2) |
| 30e | KARAAGE |
| 30f | SALAD |
| 30d | SAKE |
| ... | ... |

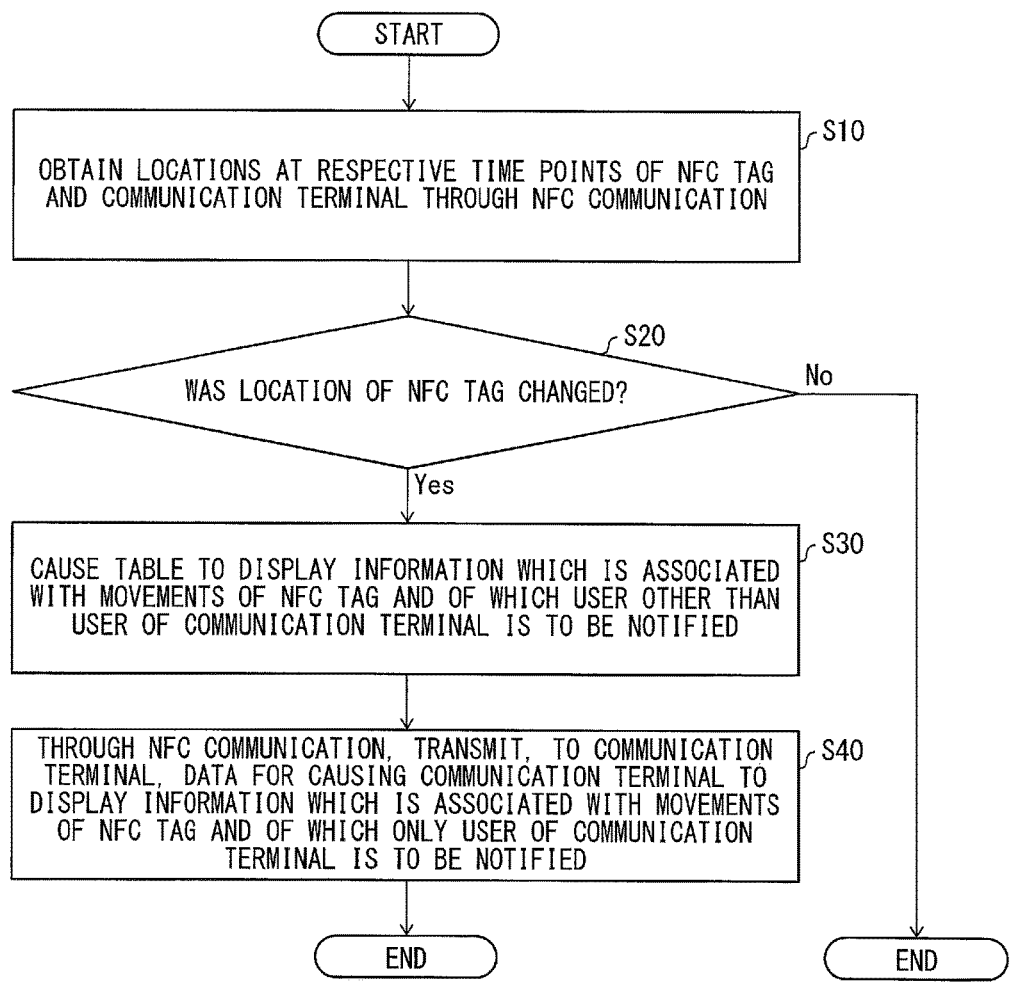

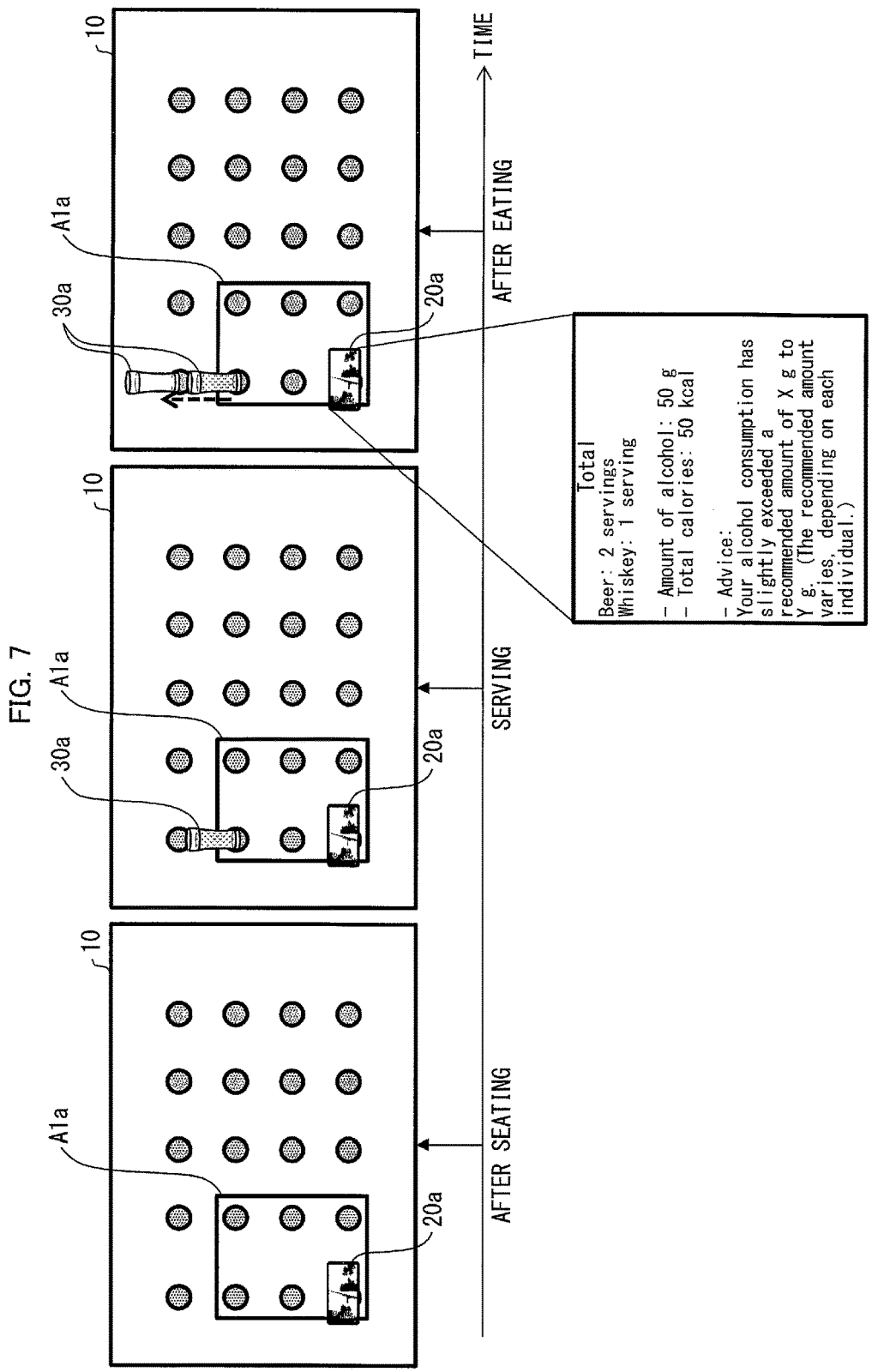

FIG. 8

| ROW NO. | PROXIMITY/NON-PROXIMITY | COMMUNICATION MODE | NFC IDENTIFICATION INFORMATION (TAG ID) | LOCATION INFORMATION CONTAINING TABLE ID | INTENSITY(10 IS HIGHEST AMONG 1 THROUGH 10) | TIME POINT |
|---|---|---|---|---|---|---|
| 1 | PROXIMITY | P2P | 20a | TABLE 1 (0, 3) | 8 | 15:45:00 |
| 2 | PROXIMITY | P2P | 20b | TABLE 1 (4, 0) | 8 | 15:48:00 |
| 3 | PROXIMITY | Card Emulation | 30a (BEER) | TABLE 1 (0, 2) | 10 | 15:58:00 |
| 4 | PROXIMITY | Card Emulation | 30e (KARAAGE) | TABLE 1 (0, 2) | 10 | 15:59:00 |
| 5 | PROXIMITY | Card Emulation | 30b (BEER) | TABLE 1 (4, 0) | 10 | 15:59:00 |
| 6 | NON-PROXIMITY | | 30a (BEER) | TABLE 1 (0, 2) | | 16:15:00 |
| 7 | PROXIMITY | Card Emulation | 30a (BEER) | TABLE 1 (3, 0) | 10 | 16:16:00 |
| 8 | PROXIMITY | Card Emulation | 30c (BEER) | TABLE 1 (0, 2) | 10 | 16:20:00 |
| 9 | NON-PROXIMITY | | 30a (BEER) | TABLE 1 (3, 0) | | 16:20:00 |
| 10 | NON-PROXIMITY | | 30c (BEER) | TABLE 1 (0, 2) | | 16:30:00 |
| 11 | PROXIMITY | Card Emulation | 30g (WHISKEY) | TABLE 1 (0, 2) | 10 | 16:35:00 |
| 12 | NON-PROXIMITY | | 30g (WHISKEY) | TABLE 1 (0, 2) | 10 | 16:45:00 |
| 13 | PROXIMITY | Card Emulation | 30g (WHISKEY) | TABLE 1 (3, 0) | 10 | 16:50:00 |
| ... | ... | ... | ... | ... | ... | ... |

FIG. 17

| NFC IDENTIFICATION INFORMATION | LOCATION INFORMATION | OPENED PAGE |
|---|---|---|
| 30a | (2, 1) | PAGES 3 AND 4 |
| 30b | (2, 1) | |
| 30c | (4, 1) | |
| 30d | (4, 1) | |
| 30e | (4, 1) | |
| 30a | (2, 1) | PAGES 5 AND 6 |
| 30b | (2, 1) | |
| 30c | (2, 1) | |
| 30d | (4, 1) | |
| 30e | (4, 1) | |

CONTROL DEVICE UTILIZING SHORT RANGE COMMUNICATION TO DETECT MOVEMENT OF AN OBJECT AND DISPLAY INFORMATION ASSOCIATED WITH THE DETECTED MOVEMENT

TECHNICAL FIELD

The present invention relates to a control device which is to be connected with a detection device, and the like.

BACKGROUND ART

A display device provided with a detecting section is known as a conventional technique.

For example, Patent Literature 1 discloses a display device in which a display section includes a plurality of NFC tags so that an external device including an NFC device can be recognized.

Moreover, Patent Literature 2 discloses a display device which detects a location of a user with respect to an information displaying section for displaying information and displays information corresponding to the user in a region corresponding to the detected location.

CITATION LIST

Patent Literature

[Patent Literature 1]
Japanese Patent Application Publication Tokukai No. 2011-175626 (Publication date: Sep. 8, 2011)
[Patent Literature 2]
Japanese Patent Application Publication Tokukai No. 2014-89501 (Publication date: May 15, 2014)

SUMMARY OF INVENTION

Technical Problem

However, the above described conventional techniques have a problem as follows: that is, a specific control to be particularly executed is not prepared for each of cases where (i) a state of a detection target detected through short range communication with the detection target changes and (ii) a plurality of detection targets are detected through short range communication.

Specifically, the technique disclosed in Patent Literature 1 does not intend to carry out (i) comparison between information detected previously and information detected this time and (ii) control for a case where a plurality of detection targets which are proximate to each other are detected. Moreover, in the technique disclosed in Patent Literature 2, pieces of information corresponding to the respective plurality of detection targets are displayed in respective regions corresponding to detected locations of the respective plurality of detection targets, but the technique disclosed in Patent Literature 2 does not carry out display specific to the case where the plurality of detection targets are detected.

The present invention is accomplished in view of the problem, and its object is to provide a control device, a control method, a control program, and the like each of which allows execution of a predetermined process in accordance with a state of a detection target which has been detected through short range communication with the detection target.

Solution to Problem

In order to attain the object, the control device in accordance with an aspect of the present invention is a control device which is to be connected to a detection device in which a plurality of detecting sections are provided on a surface of the detection device, the plurality of detecting sections detecting a detection target through short range communication with the detection target, the control device including: an obtaining section for obtaining, from the detection device, locations at respective time points of the detection target which has been detected by the plurality of detecting sections; a movement determining section for determining, based on the locations at respective time points of the detection target obtained by the obtaining section, whether or not the detection target has moved; and a first executing section for executing a process associated with movement of the detection target in a case where the movement determining section has determined that the detection target had moved.

In order to attain the object, the control device in accordance with an aspect of the present invention is a control device which is to be connected to a detection device in which a plurality of detecting sections are provided on a surface of the detection device, the plurality of detecting sections detecting a detection target through short range communication with the detection target, the control device including: an obtaining section for obtaining, from the detection device, a location of the detection target which has been detected by any of the plurality of detecting sections; a number determining section for determining the number of pieces of the detection target which has been obtained by the obtaining section; and a second executing section for executing a process associated with the number of pieces of the detection target which number has been determined by the number determining section.

In order to attain the object, the control device in accordance with an aspect of the present invention is a control device which is to be connected to a detection device in which a plurality of detecting sections are provided on a surface of the detection device, the plurality of detecting sections detecting a detection target through short range communication with the detection target, the control device including: an obtaining section for obtaining, from the detection device, a location of the detection target which has been detected, by any of the plurality of detecting sections, on each of one or more sheets constituting a medium; an identifying section for identifying a state of the medium on the surface of the detection device based on the location of the detection target which location has been obtained by the obtaining section; and a fourth executing section for executing a process associated with the state of the medium which state has been identified by the identifying section.

In order to attain the object, the display device in accordance with an aspect of the present invention includes: a display surface; and a plurality of NFC antennas which are provided so as to overlap with the display surface, the display device displaying, on the display surface, information received via the plurality of NFC antennas.

In order to attain the object, the communication terminal in accordance with an aspect of the present invention includes an NFC communication section and, in a case where at least one of the communication terminal and a detection target having an NFC tag has moved on a detection device including a plurality of NFC antennas provided on a surface of the detection device, the communication terminal displays information which the NFC communication section has received via the plurality of NFC antennas.

In order to attain the object, the communication terminal in accordance with an aspect of the present invention includes an NFC communication section and, in a case where two or more pieces of the communication terminal and/or a detection target having an NFC tag are placed on a detection device including a plurality of NFC antennas provided on a surface of the detection device, the communication terminal displays information which the NFC communication section has received via the plurality of NFC antennas.

In order to attain the object, the communication terminal in accordance with an aspect of the present invention includes an NFC communication section; a transmitting section for transmitting information from the NFC communication section to a control device via a plurality of NFC antennas in a case where the communication terminal and at least one other communication terminal are placed on a detection device including the plurality of NFC antennas provided on a surface of the detection device, the information being information to be transmitted to the at least one other communication terminal; and a receiving section for receiving information from the control device via the NFC communication section and a plurality of NFC antennas in a case where the communication terminal and at least one other communication terminal are placed on a detection device including the plurality of NFC antennas provided on a surface of the detection device, the information being used to obtain information held by the at least one other communication terminal.

In order to attain the object, the medium in accordance with an aspect of the present invention is made up of one or more sheets, and each of the one or more sheets is provided with an NFC tag.

In order to attain the object, the display control system in accordance with an aspect of the present invention includes: a detection device in which a plurality of detecting sections are provided on a surface of the detection device, the plurality of detecting sections detecting a detection target through short range communication with the detection target; a control device which is connected with the detection device; an obtaining section for obtaining locations at respective time points of the detection target which has been detected by the plurality of detecting sections; a movement determining section for determining, based on the locations at respective time points of the detection target obtained by the obtaining section, whether or not the detection target has moved; and a first executing section for executing a process associated with movement of the detection target in a case where the movement determining section has determined that the detection target had moved.

In order to attain the object, the display control system in accordance with an aspect of the present invention includes: a detection device in which a plurality of detecting sections are provided on a surface of the detection device, the plurality of detecting sections detecting a detection target through short range communication with the detection target; a control device which is connected with the detection device; an obtaining section for obtaining a location of the detection target which has been detected lay any of the plurality of detecting sections; a number determining section for determining the number of pieces of the detection target which has been obtained by the obtaining section; and a second executing section for executing a process associated with the number of pieces of the detection target which number has been determined by the number determining section.

In order to attain the object, the display control system in accordance with an aspect of the present invention includes: a detection device in which a plurality of detecting sections are provided on a surface of the detection device, the plurality of detecting sections detecting a detection target through short range communication with the detection target; a control device which is connected with the detection device; an obtaining section for obtaining a location of the detection target which has been detected, by any of the plurality of detecting sections, on each of one or mote sheets constituting a medium; an identifying section for identifying a state of the medium on the surface of the detection device based on the location of the detection target which location has been obtained by the obtaining section; and a fourth executing section for executing a process associated with the state of the medium which state has been identified by the identifying section.

In order to attain the object, the control method in accordance with an aspect of the present invention is a method for controlling a control device which is to be connected to a detection device in which a plurality of detecting sections are provided on a surface of the detection device, the plurality of detecting sections detecting a detection target through short range communication with the detection target, the method including: an obtaining step of obtaining, from the detection device, locations at respective time points of the detection target which has been detected by the plurality of detecting sections; a movement determining step of determining, based on the locations at respective time points of the detection target obtained in the obtaining step, whether or not the detection target has moved; and a first executing step of executing a process associated with movement of the detection target in a case where it has been determined in the movement determining step that the detection target had moved.

In order to attain the object, the control method in accordance with an aspect of the present invention is a method for controlling a control device which is to be connected to a detection device in which a plurality of detecting sections are provided on a surface of the detection device, the plurality of detecting sections detecting a detection target through short range communication with the detection target, the method including: an obtaining step of obtaining, from the detection device, a location of the detection target which has been detected by any of the plurality of detecting sections; a number determining step of determining the number of pieces of the detection target which has been obtained in the obtaining step; and a second executing step of executing a process associated with the number of pieces of the detection target which number has been determined in the number determining step.

In order to attain the object, the control method in accordance with an aspect of the present invention is a method for controlling a control device which is to be connected to a detection device in which a plurality of detecting sections are provided on a surface of the detection device, the plurality of detecting sections detecting a detection target through short range communication with the detection target, the method including: an obtaining step of obtaining, from the detection device, a location of the detection target which has been detected, by any of the plurality of detecting sections, on each of one or more sheets constituting a medium; an identifying step of identifying a state of the medium on the surface of the detection device based on the location of the detection target which location has been obtained in the obtaining step; and a fourth executing step of executing a process associated with the state of the medium which state has been identified in the identifying step.

Advantageous Effects of Invention

According to the aspects of the present invention, it is possible to bring about an effect of executing a predetermined process in accordance with a state of a detection target which has been detected through short range communication with the detection target.

BRIEF DESCRIPTION OF DRAWINGS

FIG. 3 is a view for explaining, in an organized manner, three communication modes of an NFC device and operations in the respective modes, (a) of FIG. 3 is a view in which operations in respective communication modes are organized, and (b) of FIG. 3 is a view illustrating a correspondence between a communication mode of the NFC device (Initiator) and a communication mode of a communication destination (Target).

FIG. 4 is a view illustrating that the control device determines a location of the communication terminal, which has been detected by the display device, in accordance with a communication intensity of NFC communication between the display device and the communication terminal.

FIG. 5 is a view showing an example of data stored in the control device, (a) of FIG. 5 is a view showing an example of location data, (b) of FIG. 5 is a view showing an example of region data, and (c) of FIG. 5 is a view showing an example of merchandise data.

FIG. 6 is a flowchart illustrating an example of a display control process that is executed by the control device.

FIG. 7 is a view for chronologically explaining a correspondence between a state (location) of the NFC tag and a process executed by the control device in the display control system illustrated in FIG. 1.

FIG. 8 is a view illustrating an example of location data in which detection time points of a plurality of NFC tags are associated with respective detected locations and the like.

FIG. 17 is a view illustrating an example of display state determined data contained in the control device illustrated in FIG. 15.

DESCRIPTION OF EMBODIMENTS

[Embodiment 1]

The following description will discuss an embodiment of the present invention in detail with respect to FIGS. 1 through 9.

[Overview of Display Control System 1]

Figure 2:
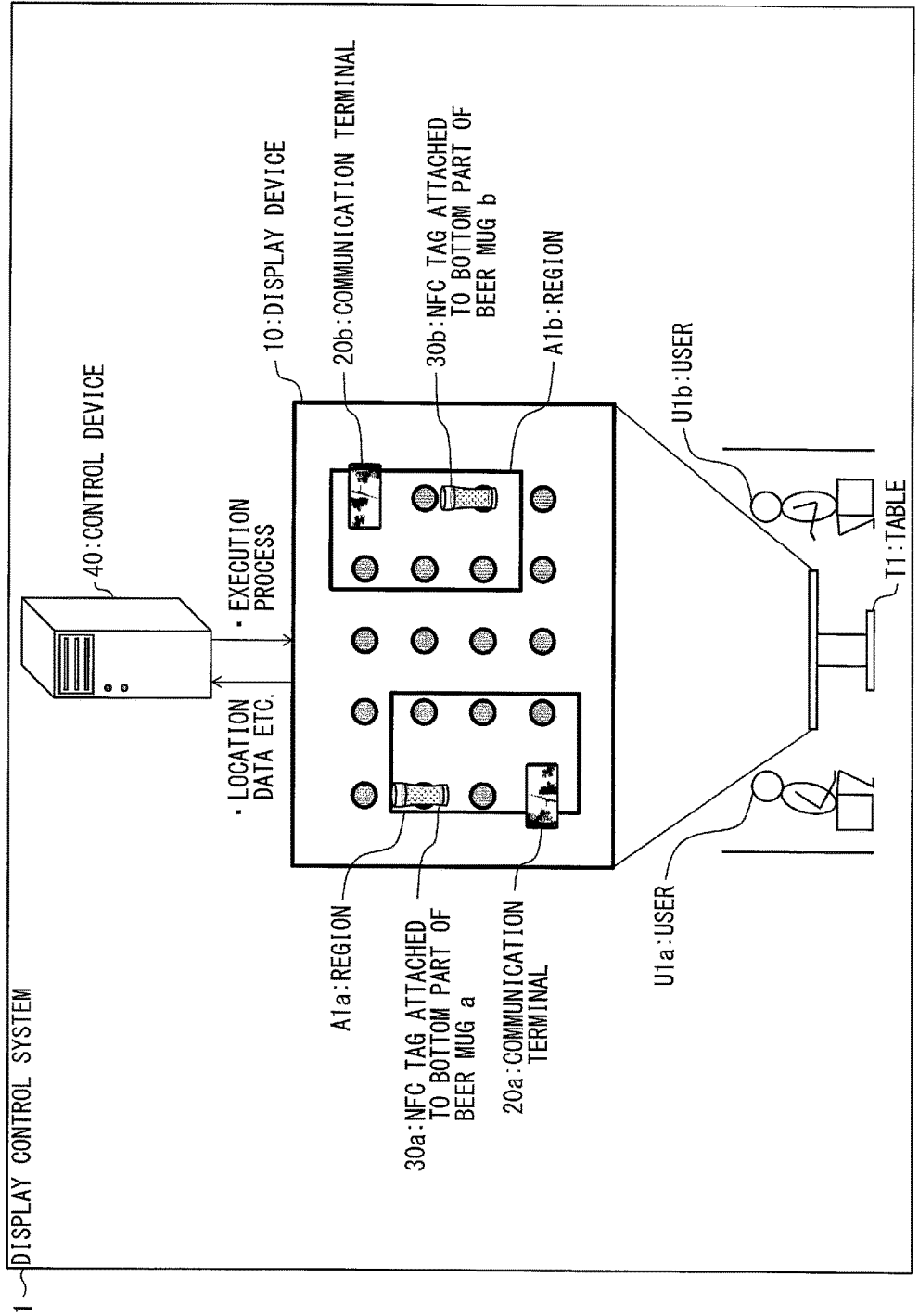
FIG. 2 is a view illustrating an overview of a display control system in accordance with each of embodiments of the present invention.

An overview of a display control system 1 (display control system) in accordance with Embodiment 1 will be described below with reference to FIG. 2. FIG. 2 is a view illustrating the overview of the display control system 1. The display control system 1 includes a display device 10 (display device), communication terminals 20 (communication terminal), NFC tags 30 (NFC tag), and a control device 40 (control device). In parts of the following description where the communication terminals 20 need to be distinguished from each other, suffix letters such as "a", "b", and "c" are added to reference signs, so that the communication terminals 20 are distinguished as, for example, a communication terminal 20a, a communication terminal 20b, and a communication terminal 20c. In contrast, in parts of the following description where the communication terminal 20a, the communication terminal 20b, and the Communication terminal 20c do not particularly need to be distinguished from each other, one or more of these will be simply referred to as "communication terminal(s) 20". Likewise, in parts of the following description where the NFC tags 30, users U1, and regions A1, for example, each need to be distinguished, suffix letters such as "a", "b", and "c" are added to reference signs. The suffix letters are omitted where such distinction is not particularly necessary.

Each of the NFC tags 30 are attached to (i) a bottom part of a tray on which a food ordered by a user U1 is arranged or (ii) a bottom part of a glass in which a drink ordered by a user U1 is served. Specifically, the NFC tag 30a is attached to a bottom part of a beer mug in which beer ordered by a user U1a. The NFC tag 30b is attached to a bottom part of a beer mug in which beer ordered by a user U1b is served.

The communication terminals 20 each include an NFC (Near Field Communication) interface section 21 (hereinafter abbreviated as "NFC-I/F section 21").

The display device 10 is a top plate of a table T1 provided in a restaurant. The display device 10 includes a display section 12 which is a display equipped with a so-called NFC multi-antenna. A display equipped with an NFC multi-antenna is, for example, a display (display section 12) having a glass plate in which a plurality of NFC antennas 11 are embedded.

The NFC antennas 11 of the display device 10 each carry out NFC communication with the communication terminals 20 (more precisely the NFC-I/F sections 21 of the communication terminals 20) and the NFC tags 30. Through the NFC communication, the display device 10 can detect the communication terminals 20 and the NFC tags 30, and can determine an NFC antenna 11 of what location responded to a communication terminal 20 and an NFC tag 30. That is, the display device 10 determines that a location of an NFC antenna 11, which responded to a communication terminal 20 and an NFC tag 30, are locations (detected location) of the communication terminal 20 and the NFC tag 30. Then, the display device 10 notifies the control device 40 of the locations of the communication terminal 20 and the NFC tag 30 thus detected.

Note that the control device 40 contains information (location information) regarding locations of a communication terminal 20 and an NFC tag 30 for each detection time point at which the detection is carried out (details will be described later). The display device 10 can notify the control device 40 of information on locations of a communication terminal 20 and an NFC tag 30 detected for each detection time point. Specifically, the display device 10 can notify the control device 40 of the following pieces of information together: (i) information on locations of a communication terminal 20 and an NFC tag 30 detected (i.e., location of an NFC antennas 11 which responded to the communication terminal 20 and the NFC tag 30) and (ii) a detection time point at which the locations were detected. Alternatively, it is possible that (i) the display device 10 notifies the control device 40 only of location information on locations of a communication terminal 20 and an NFC tag 30 detected and (ii) the control device 40 contains, in combination with the location information, a detection time point which is a time point at which the control device 40 was notified of the location information. Note that according to the display control system 1, state information such as that regarding detected locations of a communication terminal 20 and an NFC tag 30 which are detection targets only needs to be managed in combination with detection time points.

Through NFC communication with a communication terminal 20 and an NFC tag 30, an NFC antenna 11 of the display device 10 can determine whether the communication terminal 20 and the NFC tag 30 are in proximity to the NFC antenna 11 or are in non-proximity to the NFC antenna 11. Specifically, in a case where the display device 10 has detected that the NFC antenna 11 has become able to carry out NFC communication with the communication terminal 20 and the NFC tag 30, the display device 10 detects that the communication terminal 20 and the NFC tag 30 have come near to the NFC antennas 11. In a case where the display device 10 has detected that the NFC antenna 11 has become unable to carry out the NFC communication with the communication terminal 20 and the NFC tag 30, the display device 10 detects that the communication terminal 20 and the NFC tag 30 have moved away from the NFC antenna 11 (i.e., state of non-proximity). In parts of the following description where it is not necessary to distinguish between a case where proximity is detected and a case where non-proximity is detected, the description will simply state "detected". Specifically, the concept that an NFC antenna 11 "detects" a communication terminal 20 and an NFC tag 30 means any one of the following two cases: (1) a case where the NFC antenna 11 detects proximity of the communication terminal 20 and the NFC tag 30 to the NFC antenna 11 and (2) a case where the NFC antenna 11 detects non-proximity of the communication terminal 20 and the NFC tag 30 to the NFC antenna 11.

In a case where the display device 10 has detected a communication terminal 20 and an NFC tag 30, that is, in a case where the display device 10 has detected that the communication terminal 20 and the NFC tag 30 have come near to an NFC antenna 11 or the display device 10 has detected that the communication terminal 20 and the NFC tag 30 have moved away from the NFC antenna 11, the display device 10 notifies the control device 40 of detected locations and the like of the communication terminal 20 and the NFC tag 30. More precisely, in a case where the display device 10 has detected a change in communication modes of the communication terminal 20 and the NFC tag 30 and a change in a state of NFC communication between (i) the NFC antenna 11 and (ii) the communication terminal 20 and the NFC tag 30, the display device 10 notifies the control device 40 of detected locations and the like of the communication terminal 20 and the NFC tag 30. Note that detected locations of a communication terminal 20 and an NFC tag 30 of which the control device 40 is to be notified in a case where it has been detected that the communication terminal 20 and the NFC tag 30 have moved away from an NFC antenna 11 means a location of the NFC antenna 11 which has detected that the communication terminal 20 and the NFC tag 30 have moved away. Details of a communication mode of each of the communication terminals 20 will be described later.

The display section 12 of the display device 10 includes regions A1a and A1b which are set in accordance with seated locations of users U1a and U1b, respectively. Then, inside the regions A1a and A1b, respective foods for the users U1a and U1b (i.e., NFC tags 30 attached to tableware on which the foods are arranged) are served. In addition, inside the regions A1a and A1b, communication terminals 20a and 20b of the users U1a and U1b are placed, respectively. Then, information on the regions A1a and A1b (region data 422) is contained in the control device 40.

In accordance with locations at respective time points of the communication terminals 20 and the NFC tags 30 of which the control device 40 is notified by the display device 10, the control device 40 determines states of the communication terminals 20 and the NFC tags 30 such as movements of the communication terminals 20 and the NFC tags 30. Then, the control device 40 controls the display device 10 and the communication terminals 20 to execute respective processes associated with results of determining the states of the communication terminals 20 and the NFC tags 30.

For example, in a case where the control device 40 has been notified by the display device 10 of location information on locations of the communication terminals 20 and the NFC tags 30, the control device 40 carries out comparison between (i) most recent location information of which the control device 40 was most recently notified and (ii) location information on the locations of the communication terminals 20 and the NFC tags 30 which location information was contained in the control device 40. Then, in a case where the control device 40 has confirmed that the detected locations of the communication terminals 20 and the NFC tags 30 have been changed, the control device 40 determines that the communication terminals 20 and the NFC tags 30 have moved. Then, the control device 40 transmits, to the display device 10, information (execution process) that instructs the display device 10 to execute a predetermined process associated with the movements of the communication terminals 20 and the NFC tags 30. Specifically, in a case where the control device 40 has detected that a food (NFC tag 30) served in a region A1 has been located outside the region A1, the control device 40 determines that a corresponding user U1 has finished eating the food (finished a drink). Then, the control device 40 controls the display device 10 and a corresponding communication terminal 20 to display predetermined information such as (i) necessity to additionally order food/drink and (ii) calories and an amount of alcohol the user U1 has consumed by consuming the food/drink.

Note that data on an image to be displayed by a communication terminal 20 can be transmitted from the control device 40 to the communication terminal 20 through NFC communication from an NFC antenna 11 of the display device 10 to an NFC-I/F section 21 of the communication terminal 20.

With the display control system 1, it is thus possible to detect states (e.g., movements) of the communication terminals 20 and the NFC tags 30, and to control the display device 10 and the communication terminals 20 to display information which is associated with the states. This allows the display control system 1 to provide novel content exhibition and new services.

Configurations of the display device 10, the communication terminals 20, the NFC tags 30, and the control device 40 in the display control system 1 which can achieve the functions above will be described next.

An overview of the control device 40 will be provided first. The control device 40 is a control device which is to be connected to a display device 10 (detection device) in which a plurality of NFC antennas 11 (detecting sections) are provided on a surface of the display device 10, the plurality of NFC antennas 11 detecting a communication terminal 20 and an NFC tag 30 (detection target) through short range communication with the communication terminal 20 and the NFC tag 30, the control device 40 including: a location obtaining section 43 (obtaining section) for obtaining, from the display device 10, locations at respective time points of the communication terminal 20 and the NFC tag 30 which have been detected by the NFC antennas 11; a movement determining section 44 (movement determining section) for determining, based on the locations at respective time points of the communication terminal 20 and the NFC tag 30 obtained by the location obtaining section 43, whether or not the communication terminal 20 and the NFC tag 30 have moved; and a first process determination section 45 (first executing section) for executing a process associated with movements of the communication terminal 20 and the NFC tag 30 in a case where the movement determining section 44 has determined that the communication terminal 20 and the NFC tag 30 had moved.

The detection target to be detected in the display control system 1 is at least one of an NFC tag 30 and a communication terminal 20 which includes an NFC-I/F section 21 (NFC communication section) and a terminal display section 23 (display section) and in a case where the movement determining section 44 has determined that the communication terminal 20 and the NFC tag 30 had moved, the first process determination section 45 transmits, via the NFC antenna 11, information associated with movements of the communication terminal 20 and the NFC tag 30 to the communication terminal 20 so that the communication terminal 20 displays the information, the information corresponding to information which has been received from at least one of the NFC tag 30 and the communication terminal 20 via the NFC antenna 11.

The display device 10 includes: a display section 12 (display surface); and a plurality of NFC antennas 11 which are provided so as to overlap with the display section 12, the display device 10 displaying, on the display section 12, information received via the plurality of NFC antennas 11.

A communication terminal 20 is a communication terminal including an NFC-I/F section 21 (NFC communication section), in a case where at least one of the communication terminal 20 and a detection target (e.g., tableware such as a tray or a beer mug) having an NFC tag 30 has moved on the display device 10 (detection device) including NFC antennas 11 provided on a surface of the display device 10 (detection device), the communication terminal 20 displaying information which the NFC-I/F section 21 has received via the NFC antennas 11.

The display control system 1 includes: a display device 10 in which a plurality of NFC antennas 11 are provided on a surface of the display device 10, the plurality of NFC antennas 11 detecting a communication terminal 20 and an NFC tag 30 through short range communication with the communication terminal 20 and the NFC tag 30; a control device 40 which is connected with the display device 10; a location obtaining section 43 for obtaining locations at respective time points of the communication terminal 20 and the NFC tag 30 which have been detected by the NFC antennas 11; a movement determining section 44 for determining, based on the locations at respective time points of the communication terminal 20 and the NFC tag 30 obtained by the location obtaining section 43, whether or not the communication terminal 20 and the NFC tag 30 have moved; and a first process determination section 45 for executing a process associated with movements of the communication terminal 20 and the NFC tag 30 in a case where the movement determining section 44 has determined that the communication terminal 20 and the NFC tag 30 had moved.

A method for controlling the control device 40 is a method for controlling a control device which is to be connected to the display device 10 in which a plurality of NFC antennas 11 are provided on a surface of the display device 10, the plurality of NFC antennas 11 detecting a communication terminal 20 and an NFC tag 30 through short range communication with the communication terminal 20 and the NFC tag 30, the method including: an obtaining step of obtaining, from the display device 10, locations at respective time points of the communication terminal 20 and the NFC tag 30 which have been detected by the plurality of NFC antennas 11; a movement determining step of determining, based on the locations at respective time points of the communication terminal 20 and the NFC tag 30 obtained in the obtaining step, whether or not the communication terminal 20 and the NFC tag 30 have moved; and a first executing step of executing a process associated with movements of the communication terminal 20 and the NFC tag 30 in a case where it has been determined in the movement determining step that the communication terminal 20 and the NFC tag 30 had moved.

Figure 1:
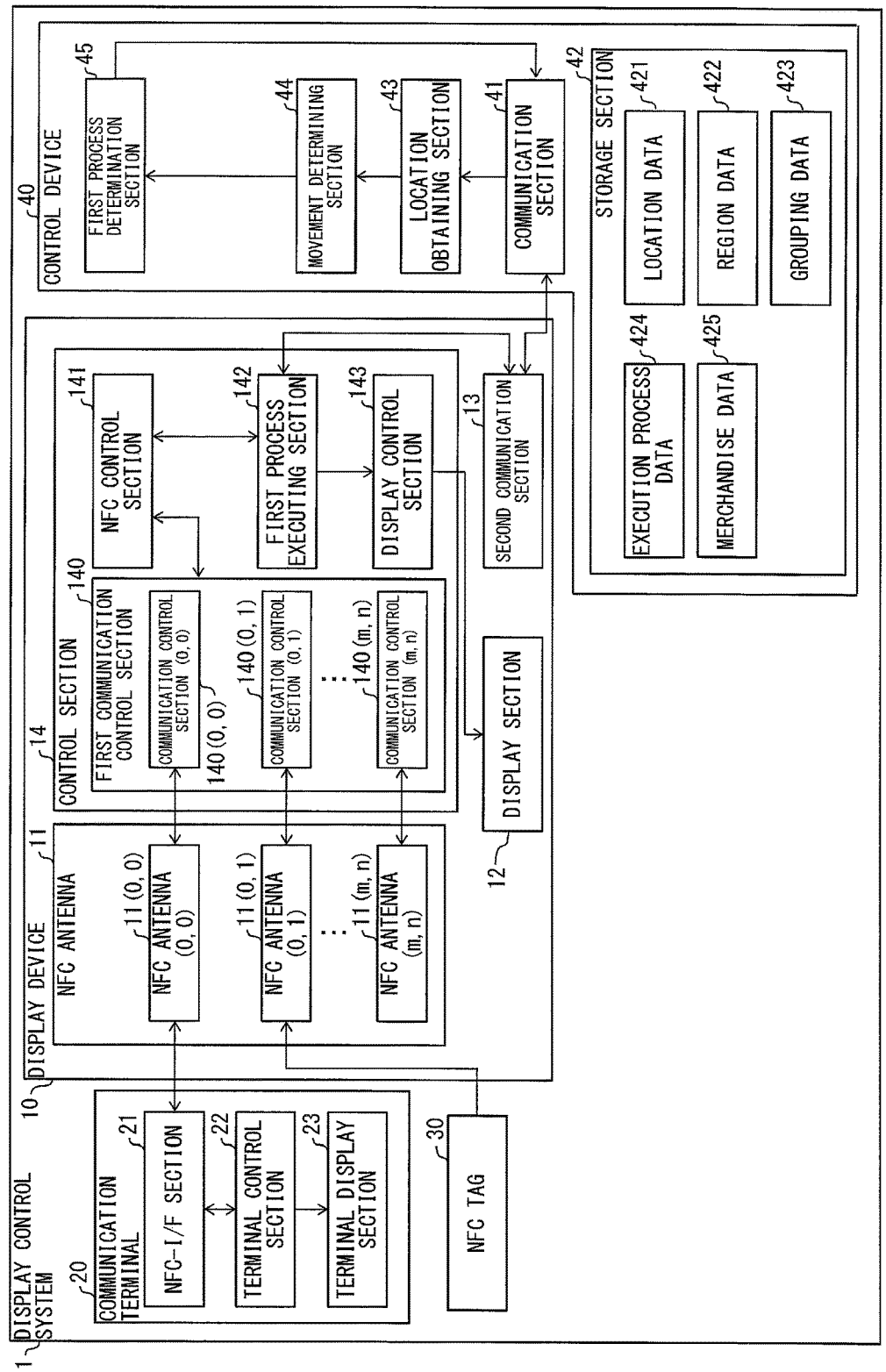
FIG. 1 is a block diagram illustrating main configurations of a display device, a communication terminal, an NFC tag, and a control device which are included in a display control system in accordance with Embodiment 1 of the present invention.

The following description will discuss the display device 10, the communication terminal 20, the NFC tag 30, and the control device 40 in the display control system 1 in more detail with reference to FIG. 1.

[Details of Configuration]

FIG. 1 is a block diagram illustrating main configurations of the display device 10, the communication terminal 20, the NFC tag 30, and the control device 40 in the display control system 1. Note that parts which are not directly relevant to Embodiment 1 (e.g., a part of the communication terminal 20 which part achieves a telephone call by utilizing a telephone line, and the like) are omitted from the descriptions below and from the block diagram. Note, however, that the display device 10, the communication terminal 20, the NFC tag 30, and the control device 40 can include such omitted configurations according to actual implementation circumstances.

(Display Device)

In a case where the display device 10 has detected a change in communication mode of the communication terminal 20 or the NFC tag 30 and a change in state of NFC communication between (i) the NFC antenna 11 and (ii) the communication terminal 20 or the NFC tag 30, the display device 10 notifies the control device 40 of a detected location and the like of the communication terminal 20 or the NFC tag 30. Specifically, in a case where the display device 10 has detected that the communication terminal 20 or the NFC tag 30 has come near to the NFC antenna 11, the display device 10 notifies the control device 40 of the following five pieces of information. That is, the display device 10 notifies the control device 40 of "detection of proximity", "communication mode of detected communication terminal 20 or NFC tag 30", "identification information of detected communication terminal 20 or NFC tag 30", "location information of detected communication terminal 20 or NFC tag 30 including table ID", and "communication intensity of NFC communication between detected communication terminal 20 or NFC tag 30 and NFC antenna 11". Alternatively, in a case where the display device 10 has detected that the communication terminal 20 or the NFC tag 30 has moved away from the NFC antenna 11 (i.e., state of non-proximity), the display device 10 notifies the control device 40 of the following three pieces of information. That is, the display device 10 notifies the control device 40 of "detection of non-proximity", "identification information of detected communication terminal 20 or NFC tag 30", and "location information of detected communication terminal 20 or NFC tag 30 including table ID".

The display device 10 receives, from the control device 40, an instruction (instruction information) on executing a process associated with a state (e.g., movement) of the communication terminal 20 or the NFC tag 30. Specifically, the display device 10 receives, from the control device 40, information to be displayed on the display section 12 of the display device 10 and information to be displayed on the terminal display section 23 of the communication terminal 20. Then, the display device 10 (i) displays, on the display section 12, the information which is to be displayed on the display section 12 of the display device 10 and (ii) transmits the information, which is to be displayed on the terminal display section 23 of the communication terminal 20, to the communication terminal 20 via the NFC antenna 11 so that the terminal display section 23 displays the information.

The display device 10 includes the NFC antenna 11, the display section 12, a second communication section 13, and a control section 14.

The NFC antenna 11 is provided so that the display device 10 communicates with the NFC-I/F section 21 of the communication terminal 20 and the NFC tag 30, and is attached to the display section 12.

The display section 12 displays an image, e.g., information which the second communication section 13 has received from the control device 40. The display section 12 displays, for example, common information which may be notified to both the users U1a and U1b of the respective communication terminals 20a and 20b.

The second communication section 13 is provided so that the display device 10 communicates with the control device 40. That is, the second communication section 13 transmits, to the control device 40, "identification information of communication terminal 20 or NFC tag 30 detected by display device 10", "information for identifying whether proximity has been detected or non-proximity has been detected", "detected location", and the like. Moreover, the second communication section 13 receives, from the control device 40, instruction information including "information to be displayed by display device 10", "information to be displayed by communication terminal 20", and the like.

Note that the "information to be displayed by communication terminal 20" received by the second communication section 13 is transmitted to the communication terminal 20 via the NFC antenna 11 through NFC communication, and the communication terminal 20 displays the "information to be displayed by communication terminal 20".

The control section 14 comprehensively controls functions of the display device 10. The control section 14 illustrated in FIG. 1 includes, as functional blocks, a first communication control section 140, an NFC control section 141, a first process executing section 142, and a display control section 143. Each of the functional blocks of the control section 14 can be realized by, for example, a central processing unit (CPU) (i) reading out a program, which is stored in a storage device (control device 40) realized by a read only memory (ROM), a non-volatile random access memory (NVRAM), or the like, to a random access memory (RAM) (not illustrated) or the like and (ii) executing the program. The following description will discuss the functional blocks in the control section 14.

(Overview of Functional Blocks)

The first communication control section 140 controls each of the plurality of NFC antennas 11, and the NFC control section 141 comprehensively controls the plurality of NFC antennas 11.

The first process executing section 142 executes, based on instruction information which the second communication section 13 has received from the control device 40, a process instructed in the instruction information. Specifically, the first process executing section 142 notifies the display control section 143 of "information to be displayed by display device 10" and causes the display control section 143 to control the display section 12 to display the "information to be displayed by display device 10". Moreover, the first process executing section 142 notifies the NFC control section 141 of "information to be displayed by communication terminal 20" and causes the NFC control section 141 to transmit the "information to be displayed by communication terminal 20" to the communication terminal 20 via the NFC antenna 11.

The display control section 143 controls a screen to be displayed by the display section 12. Specifically, the display control section 143 controls the display section 12 to display the "information to be displayed by display device 10" which has been notified by the first process executing section 142.

(NFC Tag)

The NFC tag 30 is a kind of a short range communication tag and includes an IC chip for carrying out short range communication. The IC chip stores information such as identification information for identifying each NFC tag 30. The information stored in the IC chip is read out by the display device 10, which has functions as a reader/writer device, via NFC communication between the NFC tag 30 and the NFC antenna 11.

The NFC tag 30 is attached to an underside (bottom part) of a piece of tableware such as a beer mug, a glass, or a tray on which foodstuffs are arranged. The control device 40 stores, in advance, (i) pieces of identification information (ID) of NFC tags 30 which are attached to respective pieces of tableware and (ii) pieces of information (merchandise data 425) associated with foodstuffs (such as foods and drinks) arranged on respective pieces of tableware. It is thus possible to identify what food is arranged on which piece of tableware (i.e., which NFC tag 30).

(Communication Terminal)

The communication terminal 20 includes the NFC-I/F section 21, the terminal control section 22, and the terminal display section 23. The terminal control section 22 comprehensively controls functions of the communication terminal 20. The terminal display section 23 displays an image. The terminal display section 23 is realized by, for example, a liquid crystal display including a liquid crystal panel and a backlight unit. The terminal display section 23 displays, for example, information to be confirmed by a user of the communication terminal 20 (e.g., a target calorie intake of the user of the communication terminal 20). Details of the information displayed on the terminal display section 23 will be described later.

The NFC-I/F section 21 carries out NFC communication with the NFC antenna 11 of the control device 40. By the NFC communication between the NFC-I/F section 21 and the NFC antenna 11, the display device 10 detects a location of the communication terminal 20, and transmission and reception of necessary data between the display device 10 and the communication terminal 20 are carried out. For example, the display device 10 transmits, to the communication terminal 20, data to be displayed by the communication terminal 20 through NFC communication between the NFC-I/F section 21 and the NFC antenna 11. Details of data which is transmitted and received between the display device 10 and the communication terminal 20 will be described later.

Here, three types of operations which can be executed by NFC devices like the communication terminal 20 and the display device 10 are described with reference to FIG. 3.

FIG. 3 is a view for explaining, in an organized manner, (i) three communication modes of NFC devices such as the communication terminal 20 including the NFC-I/F section 21 and the display device 10 including the NFC antenna 11 and (ii) operations in the respective modes. (a) of FIG. 3 is a view in which operations of the NFC device in respective communication modes are organized.

The NFC device can have three communication modes "Reader/Writer", "P2P", and "Card Emulation" (see (a) of FIG. 3). In the communication mode "Reader/Writer", the NFC device reads out information stored in an NFC tag, and writes information into the NFC tag. In the communication mode "P2P", the NFC device carries out communication between NFC devices. In the communication mode "Card Emulation", the NFC device operates as an NFC tag.

(b) of FIG. 3 is a view illustrating a correspondence between communication mode of the NFC device as Initiator and a communication mode of a communication destination (Target, client side) of the NFC device. That is, in a case where Initiator in the Reader/Writer mode outputs a radio wave, an NFC tag as Target responds. Moreover, in a case where Initiator in the Reader/Writer mode outputs a radio wave, Target in the "Card Emulation" mode responds. Further, in a case where Initiator in the P2P mode outputs a radio wave, Target in the P2P mode responds. That is, the NFC device as Initiator determines its communication mode by checking to which communication mode the client (i.e., Target) corresponds.

In the communication mode "Reader/Writer", the display device 10 (specifically, the NFC antenna 11) reads out, from the NFC tag 30, ID of the NFC tag 30 which ID is stored in the NFC tag 30. Similarly, in the communication mode "Reader/Writer", the display device 10 reads out ID of the communication terminal 20 (more accurately, ID of the NFC-I/F section 21).

In the communication mode "P2P", the display device 10 (specifically, the NFC antenna 11) transmits predetermined information to the communication terminal 20 which is also in the communication mode "P2P" and causes the communication terminal 20 to display the predetermined information. Further, the display device 10 in the communication mode "P2P" receives predetermined information from the communication terminal 20 which is also in the communication mode "P2P".

To put it plainly, the NFC antenna 11 enters into the communication mode "Reader/Writer" with respect to the NFC tag 30 and the communication terminal 20 which is in the communication mode "Card Emulation", and obtains ID of the NFC tag 30 and ID of the communication terminal 20. Moreover, the NFC antenna 11 enters into the communication mode "P2P" with respect to the communication terminal 20 in the communication mode "P2P", and carries out transmission and reception of information with the communication terminal 20 through NFC communication.

(Control Device)

In a case where the control device 40 has received pieces of location information of the communication terminal 20 and the NFC tag 30 from the display device 10, the control device 40 determines states (e.g., movement) of the communication terminal 20 and the NFC tag 30 based on the pieces of location information. Then, the control device 40 causes the display device 10 and the communication terminal 20 to execute processes associated with determined states of the communication terminal 20 and the NFC tag 30. The control device 40 includes a communication section 41, a storage section 42, a location obtaining section 43, a movement determining section 44, and a first process determination section 45.

The communication section 41 carries out communication with the display device 10. Specifically, the communication section 41 receives, from the display device 10, pieces of location information of the communication terminal 20 and the NFC tag 30. Moreover, the communication section 41 transmits, to the display device 10, instruction information on executing a process associated with movement of the NFC tag 30. The process associated with movement of the NFC tag 30 is, for example, causing each of the display device 10 and the communication terminal 20 to display predetermined information associated with movement of the NFC tag 30. The predetermined information to be displayed on each of the display device 10 and the communication terminal 20 will be described later in detail.

The location obtaining section 43 obtains, from the communication section 41, pieces of location information of the communication terminal 20 and the NFC tag 30. More accurately, the location obtaining section 43 obtains pieces of information on respective locations of NFC antennas 11 which have carried out NFC communication with the communication terminal 20 and the NFC tag 30, respectively.

Note that the communication section 41 can obtain, from the display device 10, pieces of information (location information) on respective locations of the communication terminal 20 and the NFC tag 30, together with detection time points at which the NFC antennas 11 detected the communication terminal 20 and the NFC tag 30, respectively. Alternatively, the communication section 41 can (i) obtain, from the display device 10, only pieces of location information of the communication terminal 20 and the NFC tag 30, and (ii) notify the location obtaining section 43 of the pieces of location information in combination with, as detection time points, time points at which the communication section 41 obtained the pieces of location information.

That is, it is only necessary that the control device 40 manages pieces of state information such as detected locations of the communication terminal 20 and the NFC tag 30, in combination with detection time points.

The location obtaining section 43 causes the location data 421 (described later) to store the pieces of location information of the communication terminal 20 and the NFC tag 30 so that the pieces of location information are associated with pieces of identification information of the communication terminal 20 and the NFC tag 30, detection time points, and the like.

The movement determining section 44 refers to location data 421 and region data 422, and determines states (e.g., whether or not moved) of the communication terminal 20 and the NFC tag 30 based on most recent pieces of location information of the communication terminal 20 and the NFC tag 30 obtained by the location obtaining section 43. For example, the movement determining section 44 determines whether or not an arrangement location of food (NFC tag 30) placed within a region A1 first (i.e., at a time point at which the NFC tag 30 was detected first) has moved out of the region A1 later. Note that the movement determining section 44 can determine whether the arrangement location of the NFC tag 30 is within the region A1 or out of the region A1 in a manner described with reference to FIG. 4 as follows.

FIG. 4 is a view for explaining a method with which the movement determining section 44 determines, based on communication intensities of NFC communication between the communication terminal 20 and the plurality of NFC antennas 11, a location of the communication terminal 20 in the display section 12 which location has been detected by the plurality of NFC antennas 11 provided in the display section 12. As illustrated in FIG. 4, depending on a location of the communication terminal 20, the communication terminal 20 may carry out NFC communication with the plurality of NFC antennas 11. In a case where the communication terminal 20 carries out NFC communication with the plurality of NFC antennas 11, that is, the plurality of NFC antennas 11 have detected the communication terminal 20, the location of the communication terminal 20 is determined based on communication intensities of the respective plurality of NFC antennas 11 which carry out NFC communication with the communication terminal 20. That is, in the example illustrated in FIG. 4, the communication terminal 20a is detected by four NFC antennas 11, i.e., NFC antennas 11(0,1), 11(0,2), 11(1,1), and 11(1,2). The movement determining section 44 determines the location of the communication terminal 20 based on communication intensities of NFC communication between the communication terminal 20 and the four NFC antennas 11, i.e., the NFC antennas 11(0,1) through 11(1,2). In the above example, the location of the communication terminal 20 is determined based on communication intensities of the plurality of NFC antennas 11. Note, however, that this applies also to a case where a location of the NFC tag 30 is determined. That is, the movement determining section 44 determines a location of the NFC tag 30 based on communication intensities of a plurality of NFC antennas 11 which carries out NFC communication with the NFC tag 30. Then the movement determining section 44 determines whether an arrangement location of the NFC tag 30 is within the region A1 or out of the region A1, that is, whether or not the arrangement location of the NFC tag 30 has moved (i.e., changed) from the inside of the region A1 to the outside.

In a case where the movement determining section 44 has determined that the NFC tag 30 had moved, that is, determined that the arrangement location of the NFC tag 30 had moved from the inside of the region A1 to the outside, the movement determining section 44 notifies the first process determination section 45 of the determination result, identification information of the NFC tag 30 which has been determined to have moved, and the like.

The first process determination section 45 obtains, from the movement determining section 44, identification information of the NFC tag 30 which has been determined, by the movement determining section 44, to have moved. Then, the first process determination section 45 obtains, with reference to the execution process data 424, a process associated with the states of the communication terminal 20 and the NFC tag 30.

The execution process data 424 stores states of the communication terminal 20 and the NFC tag 30 and processes to be executed by the control device 40 so that the states and the processes are associated with each other (details will be described later). Examples of the processes to be executed by the control device 40 encompass processes such as causing each of the display device 10 and the communication terminal 20 to display predetermined information, and the like. The execution process data 424 contains processes of the display device 10 and the communication terminal 20 as follows which processes are associated with movement of the NFC tag 30. That is, as an example of the process to be executed by the display device 10, a process is contained which is to display "information supporting additional order (e.g., information of food menu) or the like" which is to be commonly presented to the users U1a and U1b. As an example of the process to be executed by the communication terminal 20a, a process is contained which is to display "target calorie intake of user U1a, calories and amount of alcohol taken by user U1a in this meal, and the like" which are to be presented only to the user U1a.

For example, as the process associated with movement of the NFC tag 30, the first process determination section 45 obtains, with reference to the execution process data 424, a process of causing each of the display device 10 and the communication terminal 20 to display predetermined information. Then, the first process determination section 45 notifies the communication section 41 of instruction information for causing each of the display device 10 and the communication terminal 20 to display the predetermined information. The communication section 41 transmits, to the display device 10, instruction information on executing the process associated with movement of the NFC tag 30.

The display device 10 which has received the instruction information from the control device 40 executes a predetermined process in accordance with the instruction information (details will be described later). For example, the display device 10 causes the display section 12 to display predetermined information in accordance with the instruction information and transmits, to the communication terminal 20, information to be displayed by the communication terminal 20 via the NFC antenna 11. The NFC-I/F section 21 receives information, which is to be displayed by the communication terminal 20, from the NFC antenna 11 of the display device 10, and then the terminal display section 23 of the communication terminal 20 displays the information.

The storage section 42 stores various kinds of data used by the control device 40. That is, the control device 40 stores (1) a control program executed by the control device 40, (2) an OS program executed by the control device 40, (3) application programs for executing various functions by the control device 40, and (4) various kinds of data read out when the application programs are executed by the control device 40. The pieces of data of (1) through (4) are stored in a non-volatile storage device such as a read only memory (ROM), a flash memory, an erasable programmable ROM (EPROM), an electrically EPROM (EEPROM, Registered Trademark), a hard disc drive (HDD), or the like. Moreover, the control device 40 stores location data 421, region data 422, grouping data 423, execution process data 424, and merchandise data 425.

FIG. 5 is a view showing an example of data stored in the storage section 42, (a) of FIG. 5 is a view showing an example of location data 421, (b) of FIG. 5 is a view showing an example of region data 422, and (c) of FIG. 5 is a view showing an example of the merchandise data 425.

The location data 421 contains, in combination with time points (detection time points), pieces of identification information (ID) of the communication terminal 20 and the NFC tag 30 and detected locations of the communication terminal 20 and the NFC tag 30 (i.e., locations of respective NFC antennas 11 reached to the communication terminal 20 and the NFC tag 30). The location data 421 shown in (a) of FIG. 5 contains the following items. That is, an item "NFC identification information (tag ID)" includes pieces of identification information of the communication terminal 20 and the NFC tag 30 which have been detected through NFC communication with the NFC antennas 11. An item "proximity/non-proximity" includes information on whether (i) proximity to an NFC antenna 11, which had detected each of the communication terminal 20 and the NFC tag 30, has been detected or (ii) moving away (non-proximity) from the NFC antenna 11 has been detected. An item "communication mode" includes information on the communication mode (above described with reference to FIG. 3) of each of the communication terminal 20 and the NFC tag 30 which has been detected to be proximate to the NFC antenna 11. An item "location information including table ID" includes information (detected location information) on detected locations of the communication terminal 20 and the NFC tag 30 which had been detected by the NFC antennas 11, i.e., information on which ones of NFC antennas 11 of the table T1 had detected the communication terminal 20 and the NFC tag 30. An item "intensity (10 is highest among 1 through 10)" includes information on communication intensity of NFC communication between (i) each of the communication terminal 20 and the NFC tag 30 which has been detected by an NFC antenna 11 and (ii) the NFC antennas 11. Note that the (communication) intensity is represented by numerical values of "1" through "10" and "10" represents the highest (communication) intensity. An item "time point" includes detection time points at which the communication terminal 20 and the NFC tag 30 were detected by NFC antennas 11.

The region data 422 contains information which defines ranges of regions A1a, A1b, A1c, and so forth which are set in the display section 12 in accordance with seated locations of the respective users U1a, U1b, U1c, and so forth. In the region data 422 shown in (b) of FIG. 5, locations of the respective plurality of NFC antennas 11 are associated with respective regions A1 to which the plurality of NFC antennas 11 respectively belong. That is, the region data 422 defines to which regions A1 the plurality of NFC antennas 11 belong (i.e., in which regions A1 the plurality of NFC antennas 11 exist). For example, the region data 422 shown in (b) of FIG. 5 indicates that the NFC antennas 11(0,1) and 11(0,2) of the table T1 belong to the region A1a (i.e., exist in the region A1a), and the NFC antenna 11(3,0) of the table T1 belongs to the region A1b.

Note that the regions A1a, A1b, and A1c can be determined by a store side in advance. For example, the regions A1a, A1b, and A1c can be set by a store side in advance in accordance with locations at which the respective users U1a, U1b, and U1c will be seated. Alternatively, it is possible to employ a configuration in which the users U1a, U1b, and U1c select any of the regions A1a, A1b, and A1c. Alternatively, it is possible to employ a configuration in which the regions A1a, A1b, and A1c are displayed on the display section 12 such that the users can see frames of the respective regions A1a, A1b, and A1c or a configuration in which the regions A1a, A1b, and A1c cannot be seen by the users (i.e., the regions A1a, A1b, and A1c are not displayed on the display section 12).

In the grouping data 423, for example, the communication terminal 20 (e.g., the communication terminal 20a) in the region A1 (e.g., the region A1a) is associated with the NFC tags 30 (e.g., the NFC tags 30a and 30g) of foods served in the region A1. The control device 40 can grasp, with reference to the grouping data 423 and the merchandise data 425 (described later), information on (served) foods ordered by the respective users U1 who are seated at locations corresponding to the respective regions A1 (details will be described later).

The execution process data 424 contains processes which are associated with states (e.g., movement) of the communication terminal 20 and the NFC tag 30 which have been detected through NFC communication with the NFC antennas 11. For example, as a process which is associated with movement of the NFC tag 30 and is to be executed by the display device 10, the execution process data 424 contains a process of displaying information to be presented commonly to the users U1a and U1b. Moreover, as a process to be executed by the communication terminal 20a, the execution process data 424 contains, for example, a process of displaying information which is to be presented only to the user U1a.

The merchandise data 425 contains correspondence information between NFC tags 30 and respective foods arranged on pieces of tableware to which the NFC tags 30 are respectively attached. The correspondence information can include information such as a calorie, an amount of protein, and the like of a food arranged on a piece of tableware to which an NFC tag 30 is attached. (c) of FIG. 5 shows an example of the merchandise data 425 in which pieces of identification information (tag ID) of the respective NFC tags 30 are associated with pieces of information (food information) of foods arranged on respective pieces of tableware to which the respective NFC tags 30 are attached.

(Process of Determining Movement of NFC Tag)

Here, based on the location data 421 exemplified in (a) of FIG. 5, the following description explains an example of a process of determining, by the movement determining section 44, whether or not the communication terminal 20 or the NFC tag 30 has moved.

In the location data 421 shown in (a) of FIG. 5, "Row No.: 2" indicates that "proximity of the communication terminal 20a (NFC identification information: 20a) to the NFC antenna 11(0,2) of the table T1 (proximity/non-proximity: proximity)" was detected at a time point "15:46:00".

In the location data 421, "Row No.: 4" indicates that the NFC antenna 11(0,2) of the table T1 which detected proximity of the communication terminal 20a at the time point "15:46:00" detected at a time point "15:58:30" that "the communication terminal 20a moved away from the NFC antenna 11(0,2) (proximity/non-proximity: non-proximity)".

In the location data 421, "Row No.: 5" indicates that proximity of the communication terminal 20a, whose non-proximity was detected by the NFC antenna 11(0,2) of the table T1 at the time point "15:58:30", to the NFC antenna 11(3,0) of the table T1 (proximity/non-proximity: proximity) was detected at a time point "15:59:00".

That is, "Row No.: 2", "Row No.: 4", and "Row No.: 5" in the location data 421 shown in (a) of FIG. 5 indicates, for example, the following state. That is, the user U1a put the communication terminal 20a in the proximity of the NFC antenna 11(0,2) of the table T1 at "15:46:00", then lifted the communication terminal 20a at "15:58:30", and then put the communication terminal 20a in the proximity of the NFC antenna 11(3,0) of the table T1 at "15:59:00".

The movement determining section 44 refers to "Row No.: 4" and "Row No.: 5" in the location data 421 shown in (a) of FIG. 5, and determines that the communication terminal 20a has moved. That is, the movement determining section 44 first determines, for each piece of NFC identification information, whether or not the item "proximity/non-proximity" has been changed from "non-proximity" to "proximity". In a case where there is a piece of NFC identification information changed from "non-proximity" to "proximity", the movement determining section 44 compares, for the communication terminal 20 or the NFC tag 30 identified by the NFC identification information, "location information" at "non-proximity" and "location information" at "proximity". Then, in a case where "location information" varies between states of "non-proximity" and "proximity", the movement determining section 44 determines that the communication terminal 20 or the NFC tag 30 identified by the NFC identification information has moved. For example, the movement determining section 44 first detects a change of the communication terminal 20a (NFC identification information: 20a) from "non-proximity" (Row No.: 4) at a time point "15:58:30" to "proximity" (Row No.: 5) at a time point "15:59:00". In a case where the movement determining section 44 has thus confirmed that "location information: NFC antenna 11(0,2) of table T1" at "non-proximity" is different from "location information: NFC antenna 11(3,0) of table T1" at "proximity", the movement determining section 44 determines that the communication terminal 20a has moved.

Moreover, based on the region data 422 and "location information: NFC antenna 11(0,2) of table T1" at "non-proximity", the movement determining section 44 obtains that a region A1 to which the communication terminal 20a at "non-proximity" belongs is the region A1a. Similarly, based on the region data 422 and "location information: NFC antenna 11(3,0) of table T1" at "proximity", the movement determining section 44 obtains (hat a region A1 to which the communication terminal 20a at "proximity" belongs is the region A1b. Then, in a case where the movement determining section 44 has thus confirmed that the region A1a to which the communication terminal 20a at "non-proximity" belongs is different from the region A1b to which the communication terminal 20a at "proximity" belongs, the movement determining section 44 determines that the communication terminal 20a has moved from the inside of the region A1a to the outside.

(Process of Determining Foods Ordered by Users)

The control device 40 can grasp, with reference to the grouping data 423 and the merchandise data 425 (shown in (c) of FIG. 5), information on (served) foods ordered by the respective users U1 who are seated at locations corresponding to the respective regions A1. For example, in a case where the control device 40 has determined the followings:

i.e., the NFC tag 30a is located in the region A1a corresponding to a seat of the user U1a and then the NFC tag 30a is moved to the outside of the region A1a, and further the NFC tag 30d is located in the region A1a and then the NFC tag 30d is moved to the outside of the region A1a, the control device 40 executes the following processes. That is, with reference to the merchandise data 425 shown in (c) of FIG. 5, the control device 40 first grasps that the NFC tags 30a and 30d are respectively associated with beer and sake. Then, the control device 40 determines that the user U1a seated at a location corresponding to the region A1a has finished drinking the beer and sake and, for example, calculates a total alcohol intake of the user U1a and causes each of the display device 10 and the communication terminal 20 to display predetermined information.

Next, the following description will discuss, with reference to FIG. 6, an overview of a display control process that is executed by the control device 40.

FIG. 6 is a flowchart showing an example of a display control process executed by the control device 40. First, the display device 10 detects locations of the NFC tag 30a and the communication terminal 20a through NFC communication (i.e., NFC communication between an NFC antenna 11 and the NFC tag 30a, and NFC communication between the NFC-I/F section 21a of the communication terminal 20a and an NFC antenna 11). Then, the display device 10 notifies the control device 40 of the detected locations of the NFC tag 30a and the communication terminal 20a. The control device 40 obtains, from the display device 10, locations of the NFC tag 30a and the communication terminal 20a at each time point detected through the NFC communication (S10).

The control device 40, which has obtained locations of the NFC tag 30a and the communication terminal 20a at each time point from the display device 10, determines whether or not a location of the NFC tag 30a has changed (S20). In a case where the control device 40 has determined that the location of the NFC tag 30a had changed (Yes in S20), the control device 40 refers to the execution process data 424 and causes the display section 12 of the display device 10 to display information which is associated with movement of the NFC tag 30a and is to be notified also to a user (e.g., user U1b) other than the user of the communication terminal 20a (S30).

Moreover, the control device 40 transmits, to the communication terminal 20a, data for causing the communication terminal 20a to display information which is associated with movement of the NFC tag 30a and is to be notified only to the user (user U1a) of the communication terminal 20a, and causes the communication terminal 20a to display the data (S40). Specifically, the control device 40 (i) transmits, to the display device 10, data which is to be displayed by the communication terminal 20a, (ii) causes the display device 10 to transmit the data to the communication terminal 20a via the NFC antenna 11, and (iii) causes the communication terminal 20a to display the data.

In a case where the control device 40 has determined that the location of the NFC tag 30 had not changed (No in S20), the control device 40 ends the process.

Note that an order of the steps S30 and S40 can be inverted, i.e., either one of the steps S30 and S40 can be executed first. Alternatively, the steps S30 and S40 can be executed simultaneously.

The following description will discuss, with reference to FIG. 7, a concrete example of the display control process executed by the control device 40.

(Overview of Process Associated with Movement of NFC Tag)

FIG. 7 is a view for chronologically explaining that the control device 40 (display device 10) which has determined that a detected location of the NFC tag 30 had changed executes a predetermined process in the display control system 1.

As illustrated in FIG. 7, the control device 40 first set regions A1a and A1b in the display section 12 of the display device 10 in accordance with seated locations of the respective users U1a and U1b. Note that the users U1a and U1b can determine their own locations to be seated in accordance with regions A1a and A1b (serving areas) which are prepared in advance by the store side (control device 40). Pieces of information on the regions A1a and A1b (serving areas) are contained in the region data 422 of the control device 40. Then, in a case where the users U1a and U1b have put their own communication terminals 20a and 20b in respective regions A1a and A1b, the control device 40 causes the storage section 42 to store the following information. That is, the control device 40 causes the location data 421 to contain detected locations of the communication terminals 20 (communication terminals 20a and 20b) in the respective regions A1 (regions A1a and A1b). Specifically, in a case where the display device 10 has detected the communication terminal 20, the display device 10 notifies the control device 40 of ID (identification information) of the NFC-I/F section 21 of the communication terminal 20 and a location of an NFC antenna 11 which has detected the communication terminal 20. Then, the control device 40 adds the "ID of NFC-I/F section 21 of communication terminal 20" and the "location of NFC antenna 11 which has detected the communication terminal 20 (i.e., detected location of communication terminal 20)", which have been notified by the display device 10, to the location data 421.

Next, the control device 40 detects that a food has been served (completion of serving). That is, in a case where the display device 10 has detected proximity of an NFC tag 30, which is attached to a piece of tableware, to an NFC antenna 11, the display device 10 notifies the control device 40 of ID of the NFC tag 30 and a location of the NFC antenna 11 which ha s detected the NFC tag 30. The control device 40 adds the "ID of NFC tag 30 attached to tableware" and "location of NFC antenna 11 which has detected NFC tag 30", which have been notified by the display device 10, to the location data 421. In the example illustrated in FIG. 7, in a case where the control device 40 has determined that beer ordered by the user U1a (i.e., the NFC tag 30a attached to a beer mug) has been placed within the region A1a which is a serving area for the user U1a, the control device 40 detects that a food has been served (completion of serving). That is, in a case where the control device 40 has determined that the NFC antenna 11, which had detected proximity of the NFC tag 30a, belongs to the region A1a, the control device 40 detects completion of serving. Then, the control device 40 adds the detected location (serving location) of the NFC tag 30 to the location data 421 so that the detected location is associated with a time point (completion time point of serving) at which completion of serving was detected.

Note that the control device 40 can confirm what food has been served for the user U1a of the communication terminal 20a with reference to the merchandise data 425 and ID of an NFC tag 30 which is also in the region A1a (serving area) to which the NFC antenna 11 that has detected the communication terminal 20a belongs.

Subsequently, in a case where the control device 40 has determined that a meal had finished, the control device 40 causes the communication terminal 20 to display predetermined information. Specifically, first, in a case where the display device 10 has detected proximity/non-proximity of the NFC tag 30a, the display device 10 notifies the control device 40 of ID of the NFC tag 30a and a location of an NFC antenna 11 which has detected the NFC tag 30a. Then, the movement determining section 44 compares a detected location of the NFC tag 30a which location has been stored in the control device 40 at the completion of serving with a latest detected location of the NFC tag 30a which has been notified by the display device 10, and thus determines whether or not the NFC tag 30a has moved.

Specifically, as above described by using the location data 421 shown in (a) of FIG. 5, the movement determining section 44 refers to the location data 421 and determines whether or not the item "proximity/non-proximity" of the NFC tag 30a has changed from "non-proximity" to "proximity". In a case where the movement determining section 44 has determined that the state had changed from "non-proximity" to "proximity", the movement determining section 44 compares the region A1a to which the NFC tag 30a at "non-proximity" belongs with a region (e.g., the region A1b) to which the NFC tag 30a at "proximity" belongs. Then, in a case where the movement determining section 44 has confirmed that the region A1a to which the NFC tag 30a at "non-proximity" belongs is different from the region to which the NFC tag 30a at "proximity" belongs, the movement determining section 44 determines that the NFC tag 30a has moved, that is, determines that the user U1a has finished drinking beer in the beer mug to which the NFC tag 30a is attached.

In a case where the control device 40 has determined that the NFC tag 30 has moved, the control device 40 causes each of the display device 10 and the communication terminal 20 to execute the following process which is associated with movement of the NFC tag 30. That is, the control device 40 causes the display device 10 to carry out push notification with respect to the communication terminal 20 so as to cause the communication terminal 20 to display personal information such as ordered items and taken calories (i.e., information which needs to be known only by the user). For example, it is possible to cause the communication terminal 20 to display information "The cumulative total is 2 mugs of beer and 1 glass of whisky. The total alcohol amount is 50 g, the total calorie is 50 kcal. Advice: You slightly exceed an adequate alcohol amount which is X g to Y g (it depends on individuals)". Moreover, the control device 40 can cause the display device 10 to carry out push notification with respect to the communication terminal 20 so as to cause the communication terminal 20 to display a message such as "Any additional order?". The control device 40 transmits, to the display device 10, information to be displayed by the communication terminal 20, and causes the display device 10 to transmit the information to the communication terminal 20 via the NFC antenna 11.

In the above described example, in a case where the control device 40 has determined that (an NFC tag 30 attached to) a piece of tableware had moved, the control device 40 causes the display device 10 to transmit information to the communication terminal 20 via the NFC antenna 11, and the communication terminal 20 displays the information. Note, however, that the information can be displayed on the display section 12 of the display device 10. Moreover, the control device 40 can give a notification to a store staff for causing the store staff to collect pieces of tableware and to take an additional order. Note that it is preferable that the communication terminal 20 displays personal information such as a consumed calorie of the user of the communication terminal 20 and a bill to be paid and carries out processes in relation to such pieces of information, and the display section 12 of the display device 10 outputs public information such as "Call store staff?". Moreover, it is preferable that, before giving a notification from the display device 10 (table T1) to a store staff for causing the store staff to take an additional order, at least one of the communication terminal 20 and the display section 12 of the display device 10 displays a confirmation message such as "Any additional order?".

(Process Associated with Movement of Plurality of NFC Tags)

FIG. 8 is a view illustrating an example of the location data 421 in which detection time points are associated with detected locations and the like for a plurality of NFC tags 30 (NFC tags 30a, 30b, 30c, 30g, and 30e). Note that, in an example described below, the user U1a does not exceed a target alcohol intake of the user U1a by only drinking beer indicated by the NFC tag 30a, and reaches the target alcohol intake when the user U1a has finished drinking whisky indicated by the NFC tag 30g.

The control device 40 first compares "Row No.: 6" with "Row No.: 7" in the location data 421 shown in (a) of FIG. 8, and thereby determines that the user U1a has finished drinking beer indicated by the NFC tag 30a. That is, in a case where the control device 40 has confirmed that the item "proximity/non-proximity" of the NFC tag 30a had been changed from "non-proximity" to "proximity" and "location information: NFC antenna 11(0,2) of table T1" at "non-proximity" is different from "location information: NFC antenna 11(3,0) of table T1" at "proximity", the control device 40 determines that the NFC tag 30a has moved, i.e., determines that the beer indicated by the NFC tag 30a has all been drunk.

With reference to "Row No.: 9" in the location data 421 shown in (a) of FIG. 8, the control device 40 determines that a store staff or the like has collected a beer mug (i.e., a beer mug to which the NFC tag 30a is attached) of the beer which the user U1a has finished drinking.

The control device 40 compares "Row No.: 11" through "Row No.: 13" in the location data 421 shown in (a) of FIG. 8, and thereby determines that the user U1a has finished drinking newly served whisky indicated by the NFC tag 30g. That is, the control device 40 determines that whisky indicated by the NFC tag 30g was served at "16:35:00" based on the NFC tag 30g (in "Row No.: 11" in the location data 421) whose "proximity" was first detected at "16:35:00". Subsequently, the control device 40 compares "Row No.: 12" with "Row No.: 13", and confirms that the item "proximity/non-proximity" of the NFC tag 30g has changed from "non-proximity" to "proximity" and "location information: NFC antenna 11(0,2) of table T1" at "non-proximity" is different from "location information: NFC antenna 11(3,0) of table T1" at "proximity". From this, the control device 40 determines that the NFC tag 30g has moved, that is, determines that the whisky indicated by the NFC tag 30g has all been drunk.

In a case where the control device 40 has determined that the user U1a had finished drinking the beer indicated by the NFC tag 30a and the whisky indicated by the NFC tag 30g, the control device 40 confirms a total alcohol amount which has already been taken by the user U1a. Then, in a case where the control device 40 has determined that the total alcohol amount taken by the user U1a exceeds a predetermined amount, the control device 40 notifies the user U1*a* of predetermined advice information. That is, in a case where the control device 40 has detected movement of (the NFC tag 30 attached to) a beer mug or the like served within the region A1*a* corresponding to the user U1*a*, the control device 40 confirms a total alcohol amount of alcoholic beverages (such as beer) which were ordered by the user U1*a* before a time point at which the movement was detected. Then, in a case where the control device 40 has determined that the total alcohol amount of the ordered alcoholic beverages exceeds the predetermined amount, the control device 40 notifies the user U1*a* of advice information.

Note that "Row No.: 10" in the location data 421 shown in (a) of FIG. 8 indicates that (the beer indicated by) the NFC tag 30*c* entered into a state of "non-proximity" at "16:30:00". Then, in the location data 421 shown in (a) of FIG. 8, the NFC tag 30*c* is not detected after "16:30:00". It is possible that, in a case where the NFC tag 30*c* is not detected for a predetermined time period or more, the control device 40 determines that the user had finished drinking beer indicated by the NFC tag 30*c*. Moreover, it is possible that, in a case where the control device 40 has detected that another drink (e.g., the NFC tag 30*p*) had been served before the predetermined time period elapses, the control device 40 determines that the user had finished drinking beer indicated by the NFC tag 30*c*. This is because there is a possibility that the user has handed the beer mug of the beer, which is indicated by the NFC tag 30*c* and had all been drunk by the user, over to a store staff without putting the beer mug on the table T1.

In a case where the display device 10 has detected any change in state (proximity/non-proximity, change in antenna intensity, change in communication mode, or the like) of NFC communication between (i) the communication terminal 20 and the NFC tag 30 and (ii) the NFC antennas 11, the display device 10 notifies the control device 40 of the change. The control device 40 stores all pieces of information notified by the display device 10 so that all the pieces of information are associated with detection time points (notification time points), and the control device 40 can thereby determine states of the communication terminal 20 and the NFC tag 30.

(Additional Remarks 1)

Figure 9:
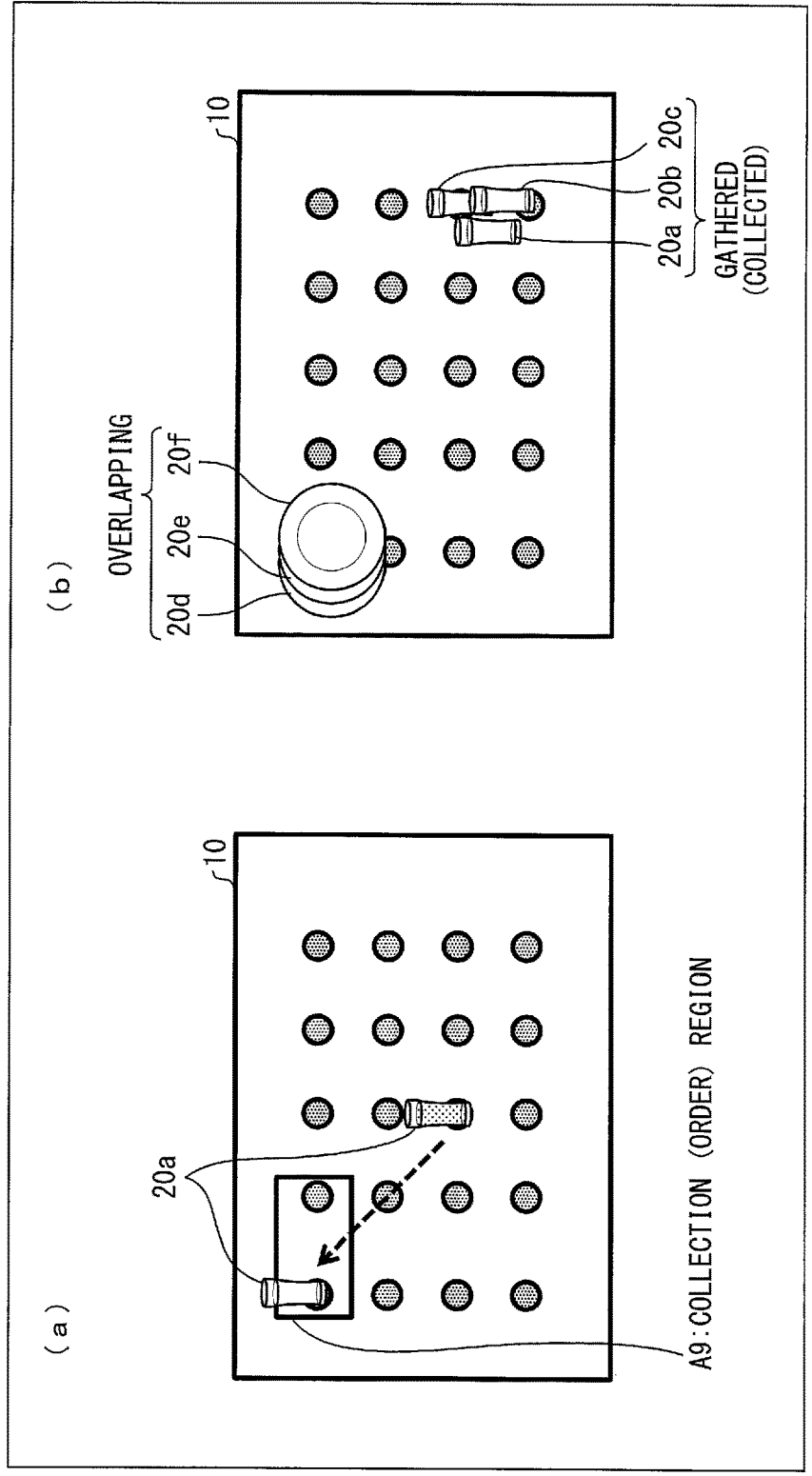
FIG. 9 is a view for explaining an example, except for movement, of a state of an NFC tag which state is to be detected for the control device to execute a predetermined process, (a) of FIG. 9 illustrates that a predetermined process is executed in a case where it has been determined that a detected location of an NFC tag falls within a predetermined region, and (b) of FIG. 9 illustrates that a predetermined process is executed in a case where it has been determined that a plurality of NFC tags are proximate to each other or are at identical locations.

FIG. 9 is a view for explaining an example of a state, other than movement, of an NFC tag to be detected in order for the control device 40 to execute a predetermined process. (a) of FIG. 9 is a view indicating that the control device 40 executes a predetermined process by determining that a detected location of an NFC tag 30 falls within a predetermined region.

In the example described above, the control device 40 determines movement of the NFC tag 30 based on a relation with the region A1 (serving area) at the beginning of serving. However, as illustrated in (a) of FIG. 9, it is possible to employ a configuration in which a collection (order) region A9 is set in advance and, in a case where the control device 40 has determined that (an NFC tag 30 attached to) a piece of tableware had moved to the collection region A9, the control device 40 executes the predetermined process associated with movement of the NFC tag 30.

(Additional Remarks 2)

In the example described above, in a case where the control device 40 has determined that an NFC tag 30 (or a communication terminal 20) had moved, the control device 40 executes the predetermined process. However, as illustrated in (b) of FIG. 9, it is possible to employ a configuration in which, in a case where the control device 40 has determined that NFC tags 30 (or communication terminals 20) are overlapping with each other or proximate to each other, the control device 40 executes the predetermined process. Further, it is possible to employ a configuration in which, in a case where the control device 40 has determined that NFC tags 30 (or communication terminals 20) which are overlapping with each other had moved, the control device 40 executes the predetermined process. (b) of FIG. 9 illustrates that, in a case where the control device 40 has determined that a plurality of NFC tags 30 are proximate to each other or are in the same location, the control device 40 executes a predetermined process. As illustrated in (b) of FIG. 9, the control device 40 can execute a predetermined process in a case where the control device 40 has detected that a plurality of NFC tags 30 are proximate to each other or are in the same location.

(Additional Remarks 3)

In the example described above, movement or the like of an NFC tag 30 attached to a piece of tableware is determined. Note, however, that each of the processes can be executed based on determination as to movement or the like of a communication terminal 20. For example, the control device 40 can execute a process of supporting payment in any of the following cases (i) where the control device 40 has determined that a communication terminal 20 had moved to a region A1*z* for a predetermined payment process, (ii) where the control device 40 has determined that a plurality of communication terminals 20 which are overlapping with each other are placed on the display device 10, and (iii) where the control device 40 has determined that a plurality of communication terminals 20 which are gathering are placed on the display device 10 (i.e., a plurality of communication terminals 20 are proximate to each other). For example, the control device 40 can cause the display device 10 to carry out a predetermined process so that payment (e.g., electronic money payment) can be made between the display device 10 and the communication terminal 20. Further, it is possible to cause the display device 10 to display a split bill. Note that the process executed in a case where the control device 40 has determined that a plurality of communication terminals 20 had been detected will be described also in another embodiment.

(Additional Remarks 4)

The process associated with movement of the NFC tag 30 is not limited to the above described example. For example, it is possible that a process of "causing at least one of the display device 10 and the communication terminal 20 to display information (e.g., food menu) for supporting the user to additionally order a food" is associated with movement of (an NFC tag 30 attached to) a piece of tableware. Alternatively, it is possible that a process of "notifying a store staff that the user has finished eating the food arranged on the piece of tableware" is associated with movement of the NFC tag 30.

(Additional Remarks 5)

In the above described example, it is possible that the control device 40 stores a time point at which serving was completed (completion time point of serving) and compares the completion time point of serving information with a time point at which movement of (an NFC tag 30 attached to) a piece of tableware was detected. For example, in a case where a time difference between information on a time point at which serving of a food was completed and a time point at which movement of (an NFC tag 30 attached to) a piece of tableware was detected is within a predetermined time period (e.g., within one minute), the control device 40 can determine that the user has not finished eating the food yet. By thus taking into consideration a time difference between the completion time point of serving and the detection time point of the movement of the piece of tableware, it is possible to prevent the control device 40 from mistakenly determining that the user has finished eating the food, even in a case where the user has moved the piece of tableware on which the food is arranged immediately after the food is served.

(Additional Remarks 6)

Note that, in a case where a content is transmitted from the display device 10 to the communication terminal 20, it takes time to transmit a content of large data amount via the NFC antenna 11. In view of this, it is possible to employ a configuration in which, for example, the display device 10 transmits, through NFC communication, only a URL for obtaining the content to the communication terminal 20 at a timing of a trigger, that is, at a timing at which the display device 10 transmits the content to the communication terminal 20, and the communication terminal 20 accesses the URL with a browser via WiFi (Registered Trademark). Alternatively, it is preferable to employ a configuration in which the display device 10 transmits the URL to the communication terminal 20 via, for example, NFC communication at a time point at which the control device 40 determined that the communication terminal 20 had been placed on the display device 10, the communication terminal 20 accesses the URL with a browser via WiFi (Registered Trademark), and the trigger carries out push delivery with use of WebSocket. Note that the process flow of "from URL to browser" is not essential, and it is possible to employ a configuration of kicking a dedicated application.

[Embodiment 2]

Figure 10:
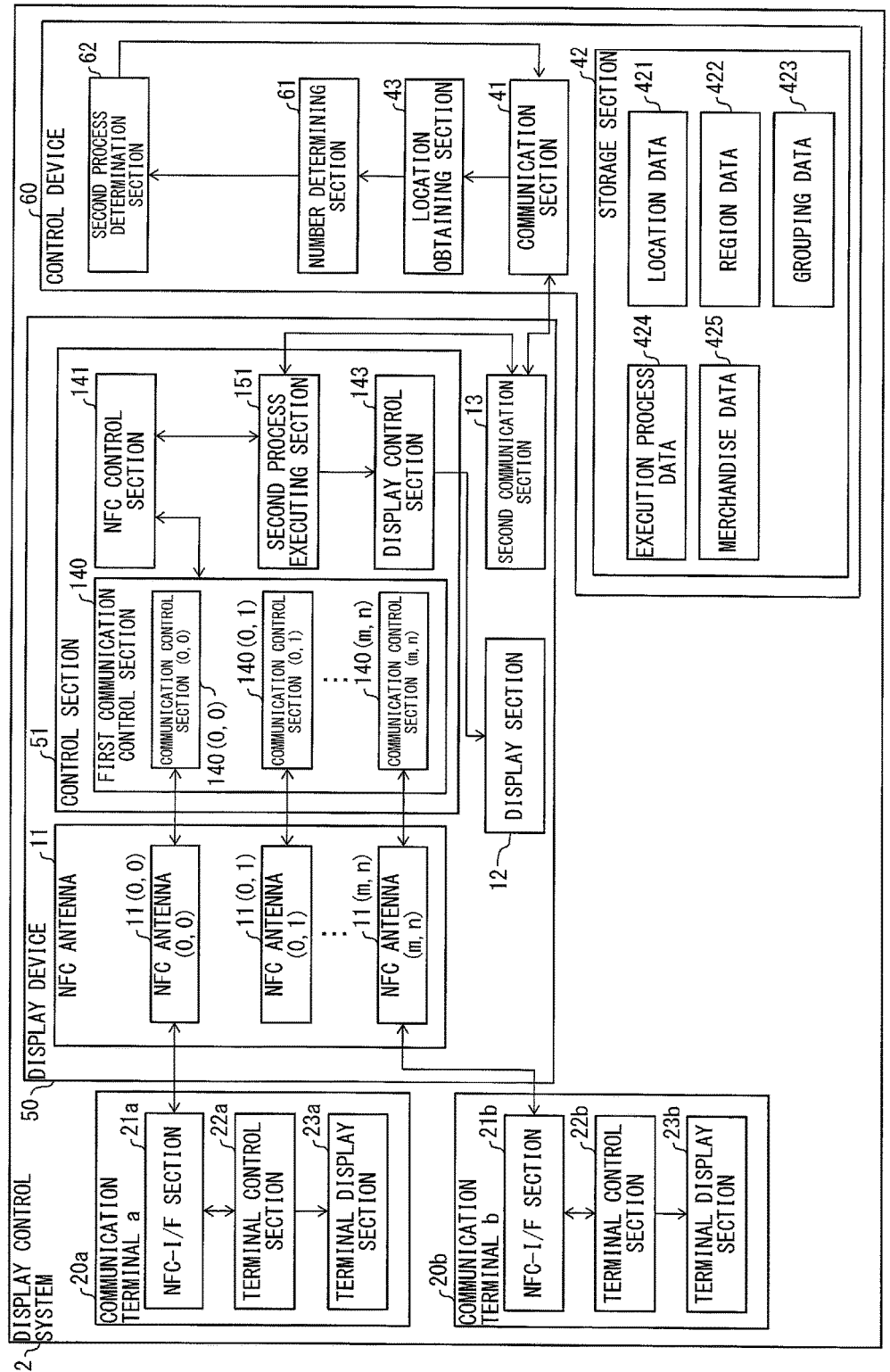
FIG. 10 is a block diagram illustrating main configurations of a display device, communication terminals, NFC tags, and a control device in a display control system in accordance with Embodiment 2 of the present invention.
Figure 11:
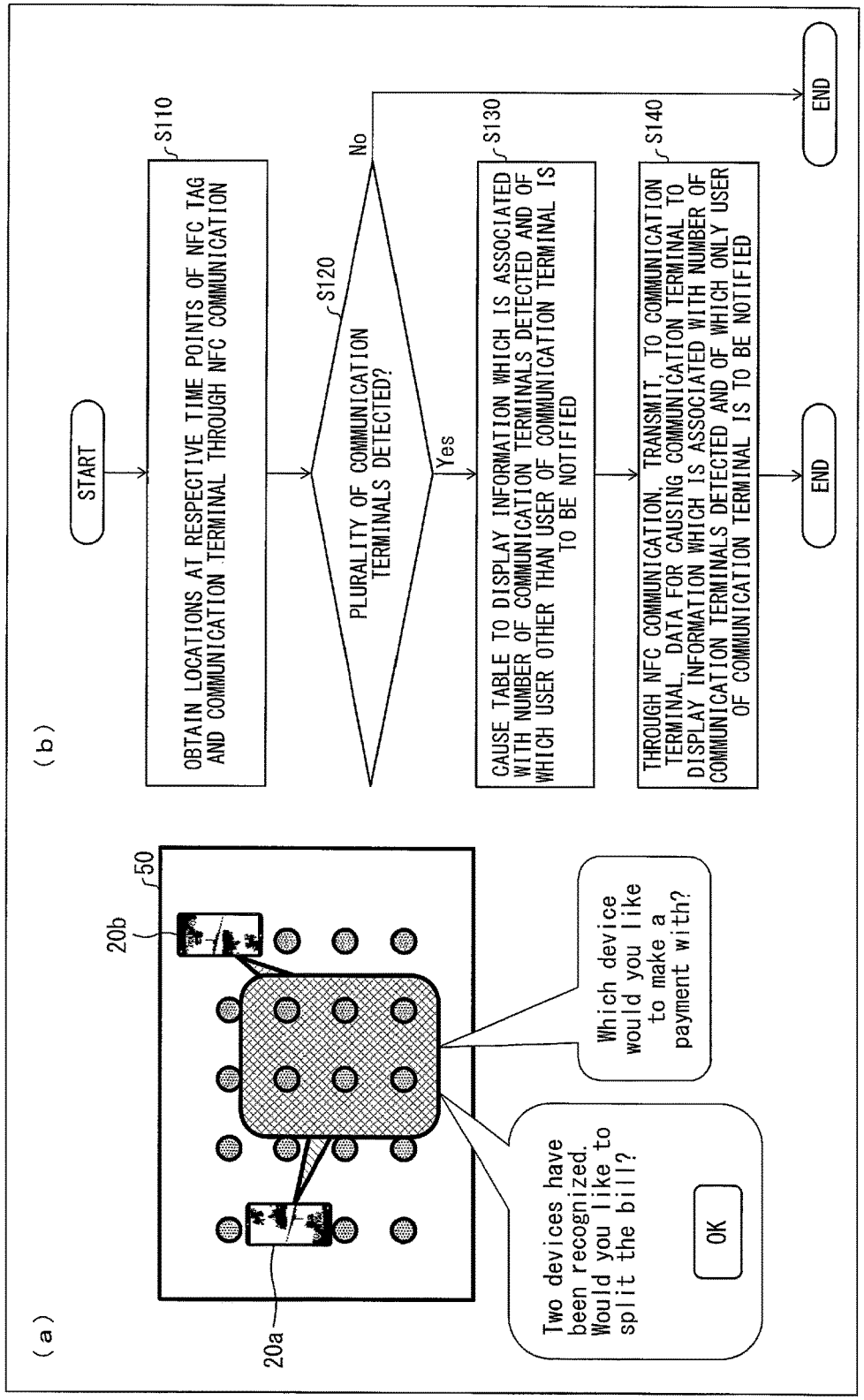
FIG. 11 is a view for explaining a process executed by the display control system illustrated in FIG. 10. (a) of FIG. 11 is a view for explaining an example of information displayed on the display device in a case where two communication terminals have been detected in the display control system illustrated in FIG. 10. (b) of FIG. 11 is a flowchart showing an example of a display control process executed by the control device illustrated in FIG. 10.
Figure 12:
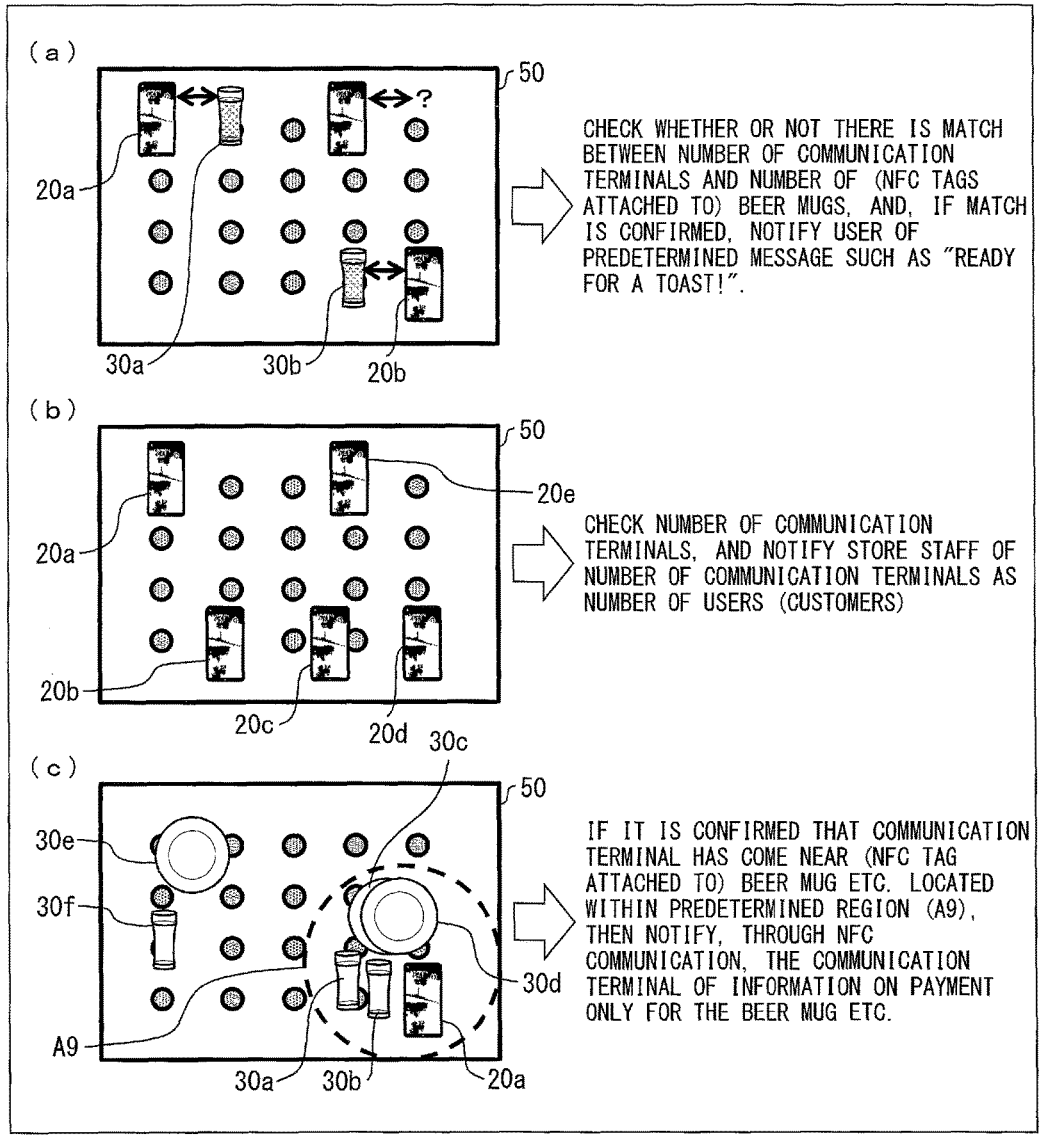
FIG. 12 is a view for explaining an example of states, other than the number of communication terminals, of the communication terminals and the like to be detected in order for the control device illustrated in FIG. 10 to execute a predetermined process. (a) of FIG. 12 is a view indicating that a predetermined process is executed in a case where a match has been determined between the number of communication terminals and the number of NFC tags. (b) of FIG. 12 is a view indicating that the number of communication terminals is determined so as to (i) regard the number of communication terminals as the number of users and (ii) execute a predetermined process. (c) of FIG. 12 is a view indicating that a predetermined process is executed in a case where it has been determined that a communication terminal has been placed in a location in proximity to NFC tags located in a predetermined region.

The following description will discuss another embodiment of the present invention with reference to FIGS. 10 through 12. For simplicity of the description, Embodiment 2 will describe only a configuration (process order and process content) differing from that of Embodiment 1. That is, the configurations and the like described in Embodiment 1 are all encompassed in Embodiment 2. This also applies to the definitions of terms appearing in Embodiment 1. A display control system 2 (display control system) in accordance with Embodiment 2 includes communication terminals 20, NFC tags 30, a display device 50, and a control device 60. First, an overview of the control device 60, the display device 50, the communication terminals 20, and the like in the display control system 2 will be described below.

That is, the control device 60 is a control device which is to be connected to the display device 50 (detection device) in which a plurality of NFC antennas 11 (detecting sections) are provided on a surface of the display device 50, the plurality of NFC antennas 11 detecting a communication terminal 20 and an NFC tag 30 (detection target) through short range communication with the communication terminal 20 and the NFC tag 30, the control device including: a location obtaining section 43 (obtaining section) for obtaining, from the display device 50, locations of the communication terminal 20 and the NFC tag 30 which have been detected by any of the plurality of NFC antennas 11; a number determining section 61 (number determining section) for determining the number of the communication terminal 20 and the NFC tag 30 which have been obtained by the location obtaining section 43; and a second process determination section 62 (second executing section) for executing a process associated with the number of the communication terminal 20 and the NFC tag 30 which number has been determined by the number determining section 61.

The second process determination section 62 of the control device 60 transmits, via an NFC antenna, information associated with the number of communication terminals 20 and NFC tags 30 which number has been determined by the number determining section 61 to the communication terminal 20 so that the communication terminal 20 displays the information, the information corresponding to information which has been received from at least one of the communication terminal 20 and the NFC tag 30 via the NFC antenna.

The communication terminal 20 is a communication terminal including an NFC-I/F section 21 (NFC communication section), in a case where two or more the communication terminal 20 and/or a detection target having an NFC tag 30 are placed on the display device 50 (detection device) including a plurality of NFC antennas 11 provided on a surface of the display device 50, the communication terminal 20 displaying information which the NFC-I/F section 21 has received via the plurality of NFC antennas 11.

The display control system 2 is a display control system including: the display device 50 in which a plurality of NFC antennas 11 are provided on a surface of the display device 50, the plurality of NFC antennas 11 detecting a communication terminal 20 and an NFC tag 30 through short range communication with the communication terminal 20 and the NFC tag 30; the control device 60 which is connected with the display device 50; a location obtaining section 43 for obtaining a location of the communication terminal 20 and the NFC tag 30 which have been detected by any of the plurality of NFC antennas 11; a number determining section 61 for determining the number of communication terminals 20 and NFC tags 30 which have been obtained by the location obtaining section 43; and a second process determination section 62 for executing a process associated with the number of communication terminals 20 and NFC tags 30 which number has been determined by the number determining section 61.

A method for controlling the control device 60 is a method for controlling a control device which is to be connected to a display device 50 in which a plurality of NFC antennas 11 are provided on a surface of the display device 50, the plurality of NFC antennas 11 detecting a communication terminal 20 and an NFC tag 30 through short range communication with the communication terminal 20 and the NFC tag 30, the method including: an obtaining step of obtaining, from the display device 50, locations of the communication terminal 20 and the NFC tag 30 which have been detected by any of the plurality of NFC antennas 11; a number determining step of determining the number of communication terminals 20 and NFC tags 30 which have been obtained in the obtaining step; and a second executing step of executing a process associated with the number of communication terminals 20 and NFC tags 30 which number has been determined in the number determining step.

The following description will discuss the display device 50, the communication terminals 20, the NFC tags 30, and the control device 60 in the display control system 2 in more detail with reference to FIG. 10.

FIG. 10 is a block diagram illustrating main configurations of the display device 50, the communication terminals 20, the NFC tags 30, and the control device 60 in the display control system 2 in accordance with Embodiment 2 of the present invention.

The display device 50 includes, instead of the first process executing section 142 of the display device 10, a second process executing section 151. The second process executing section 151 executes, based on instruction information which a second communication section 13 has received from the control device 60, a process instructed in the instruction information.

In comparison with the control device 40, the control device 60 includes the number determining section 61 and the second process determination section 62. The number determining section 61 determines the number of communication terminals 20 and NFC tags 30 detected by the NFC antennas 11, and notifies the second process determination section 62 of, for example, (i) the number thus determined, (ii) identification information of the communication terminals 20 and the NFC tags 30, and (iii) detected locations of the communication terminals 20 and the NFC tags 30. The second process determination section 62 obtains, from the number determining section 61, information on the number of communication terminals 20 and NFC tags 30 detected by the NFC antennas 11. Then, the second process determination section 62 obtains, with reference to execution process data 424, a process associated with the number of communication terminals 20 and NFC tags 30 detected.

FIG. 11 is a view for explaining a process executed by the display control system 2. (a) of FIG. 11 is a view illustrating an example of information displayed on the display section 12 of the display device 50 in a case where two communication terminals (e.g., communication terminals 20a and 20b) have been detected in the display control system 2.

In a case where the control device 60 has determined that a plurality of detection targets (e.g., communication terminals 20) have been detected in the display control system 2, the control device 60 executes a process corresponding to the number of detection targets thus detected. First, in a case where proximity of an NFC antenna 11 to a communication terminal 20 has been detected, the display device 50 notifies the control device 60 of, for example, (i) identification information of the communication terminal 20, (ii) a detected location, and (iii) a detection time point. In a case where the control device 60 has determined that a plurality of communication terminals 20 (e.g., communication terminals 20a and 20b) are present on the display section 12 of the display device 50, the control device 60 regards the number of communication terminals 20 as the number of users, and then executes a predetermined process. For example, in a case where a payment for a meal at a table T1 is split by the number of users, the control device 60 controls the display device 50 to display an amount due per person (see (a) of FIG. 11). The control device 60 also controls each of the communication terminals 20a and 20b to pay a split amount (amount due per person in the case where the payment is split by the number of users). Note that in a case where the display section 12 of the display device 50 is controlled to display predetermined information, the control device 60 controls the display device 50 to display a total amount due and a split amount on a region of the display section 12 on which region neither of the communication terminals 20a and 20b is placed.

(b) of FIG. 11 is a flowchart showing an example of a display control process executed by the control device 60. First, the display device 50 detects locations of the communication terminal 20a and the communication terminal 20b through NFC communication (NFC communication between an NFC antenna 11 and an NFC-I/F section 21a of the communication terminal 20a and NFC communication between an NFC antenna 11 and an NFC-I/F section 21b of the communication terminal 20b). Then, the display device 50 notifies the control device 60 of the locations of the communication terminal 20a and the communication terminal 20b thus detected. The control device 60 obtains, from the display device 50, locations at respective time points of the communication terminal 20a and the communication terminal 20b detected through NFC communication (S110).

The control device 60, which has obtained the locations at the respective time points of the communication terminal 20a and the communication terminal 20b from the display device 50, determines whether or not a plurality of communication terminals 20 have been detected (S120). In a case where the control device 60 has determined that a plurality of communication terminals 20 have been detected (Yes in S120), for example, in a case where the control device 60 has determined that the communication terminal 20a and the communication terminal 20b have been detected, the control device 60 executes the following process. The control device 60 controls, with reference to execution process data 424, the display section 12 of the display device 50 to display information which is associated with the number of communication terminals 20 detected (the number of communication terminals 20 is "2" in the example above) and of which a user(s) other than the users of the communication terminals 20 is/are to be notified (S130).

The control device 60 also (i) transmits, to each of the communication terminals 20 through NFC communication, data for controlling each of the communication terminals 20 to display information which is associated with the number of communication terminals 20 detected and of which only the users of the communication terminals 20 are to be notified and (ii) controls the communication terminal 20a to display the information (S140). Specifically, the control device 60 is configured to (i) transmit, to the display device 50, data for the communication terminal 20a to display, (ii) control the display device 50 to transmit the data to the communication terminal 20a through NFC antenna 11, and (iii) control the communication terminal 20a to display the data.

In a case where the control device 60 has determined that a plurality of communication terminals 20 are not detected (No in S120), the control device 60 finishes the process. Note that an order of the steps S130 and S140 can be inverted, i.e., either one of the steps S130 and S140 can be executed first. Alternatively, the steps S130 and S140 can be executed simultaneously.

FIG. 12 is a view for explaining an example of states, other than the number of communication terminals 20, of communication terminals 20 and NFC tags 30 to be detected by the display device 50 in order for the control device 60 to execute a predetermined process.

(a) of FIG. 12 is a view indicating that the control device 60 executes a predetermined process in a case where a match has been determined between the number of communication terminals 20 detected by the display device 50 and the number of NFC tags 30 detected by the display device 50. Specifically, the control device 60 determines whether or not the number of communication terminals 20 detected by the display device 50 matches the number of (NFC tags 30 attached to) beer mugs detected by the display device 50. Then, in a case where the control device 60 has determined a match between the number of communication terminals 20 and the number of beer mugs, the control device 60 notifies the communication terminals 20 that, for example, drinks for all of the users have been served. Alternatively, the control device 60 controls the display section 12 to display a predetermined message such as "Ready for a toast!", so that the users are notified that drinks for all of the users have been served.

For example, in a case where a plurality of users are located at a respective plurality of tables T1 (e.g., T1*a*, T1*b*, T1*c*, . . . ) such as a case of a party in which a large number of participants are present or in a case where a table T1 is extremely large, it is difficult to determine whether or not a speech for a toast can be started, that is, whether or not everyone is ready for the party to be started. Note that in a case where a plurality of users are located at a respective plurality of tables T1 (T1*a*, T1*b*, T1*c*, . . . ), it is possible to (i) register, in the control device 60 in advance, the plurality of tables T1 as a single group and (ii) allow the plurality of tables (T1*a*, T1*b*, T1*c*, . . . ) to share information via the control device 60.

(b) of FIG. 12 is a view indicating that the control device 60 determines the number of communication terminals 20 so as to (i) regard the number of communication terminals 20 as the number of users and (ii) execute a predetermined process. Specifically, the control device 60 notifies store staff of, as the number of users, the number of communication terminals 20 detected by the display device 50. In a case where the control device 60 has determined a change in the number of communication terminals 20 detected by the display device 50, the control device 60 notifies store staff of, for example, (i) the change in the number of participants and (ii) the number of participants after the change. That is, the control device 60 notifies the store staff that the number of communication terminals 20 detected by the display device 50 has increased (or decreased).

Since the control device 60 notifies store staff that the number of customers increased (or some customers left, so that the number of customers decreased), a store can, for example, quickly provide a glass of cold water (glass of water). In addition, in a case where a payment is to be made according to the number of customers and not according to the foods ordered such as a case of an all-you-can-drink course, it is possible to avoid forgetting charges for the number of customers increased.

(c) of FIG. 12 is a view indicating that the control device 60 executes a predetermined process in a case where the control device 60 has determined that a communication terminal 20 has been placed in a location in proximity to NFC tags 30 located in a predetermined region. In a case where the control device 60 has determined that a communication terminal 20 has been placed in proximity to (NFC tags 30 attached to) tableware such as a glass and a tray all provided in a predetermined collection region A9, the control device 60 carries out a process for a payment only for the tableware first. Therefore, in a case where a user U1 places, in the predetermined collection region A9, tableware to which an NFC tag 30 is attached and then places a communication terminal 20 in proximity to the tableware, the user U1 can first make a payment only for the tableware. This is particularly effective in a case where only one of a plurality of customers at a meal leaves first and the one of the plurality of customers wants to pay only for how much he/she ate.

[Embodiment 3]

Figure 13:
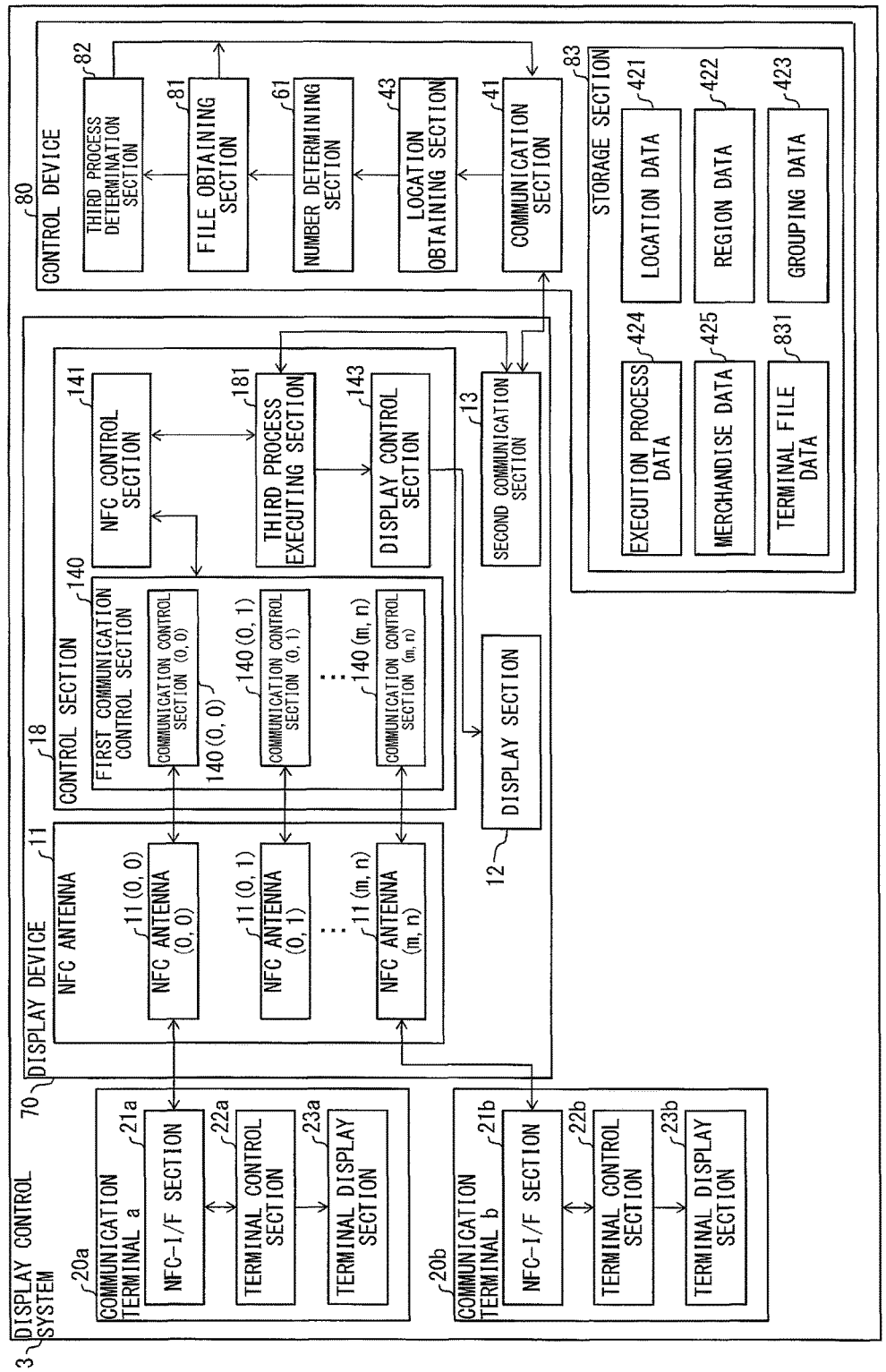
FIG. 13 is a block diagram illustrating main configurations of a display device, communication terminals, NFC tags, and a control device in a display control system in accordance with Embodiment 3 of the present invention.
Figure 14:
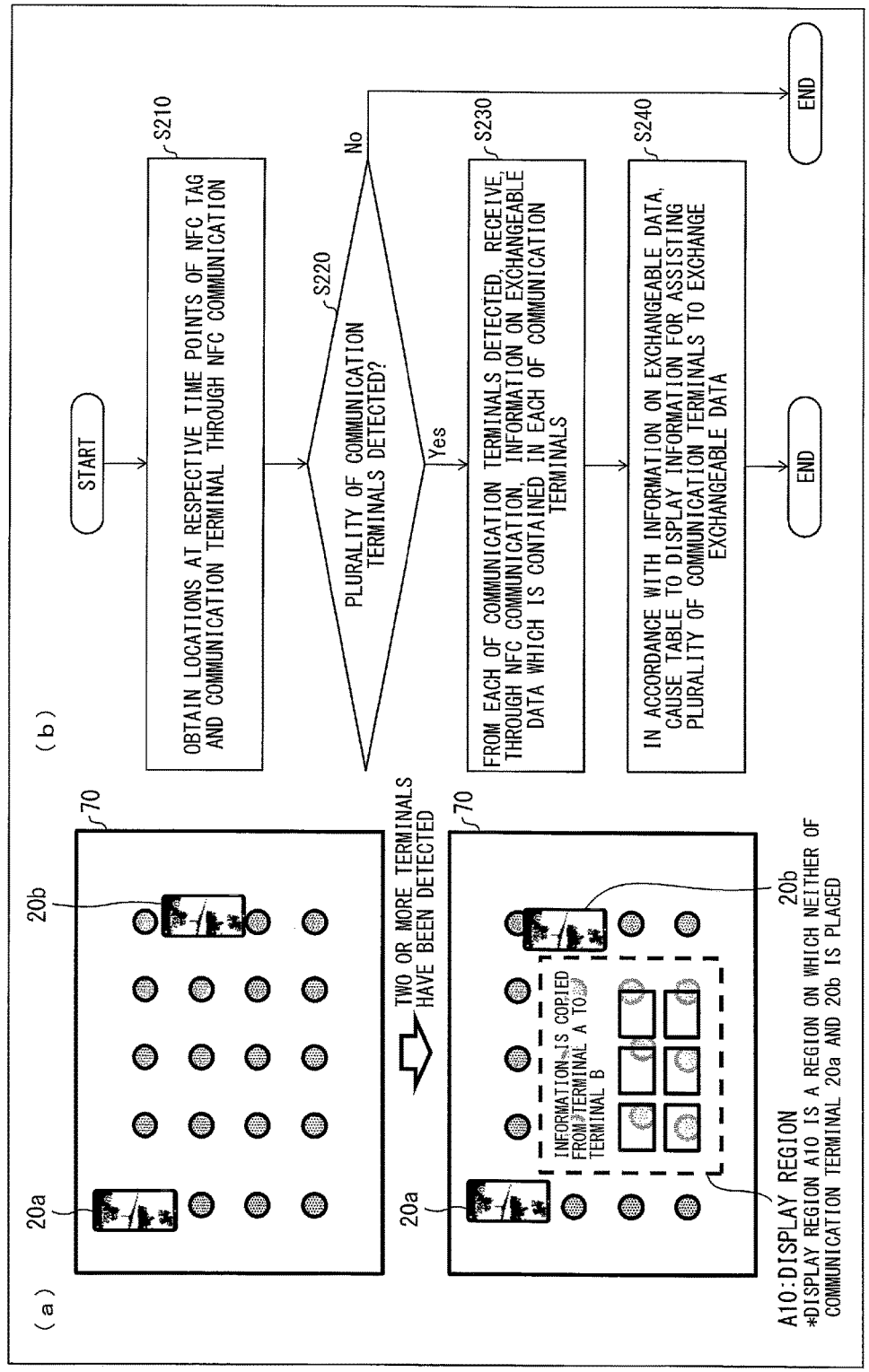
FIG. 14 is a view for explaining a process executed by the display control system illustrated in FIG. 13. (a) of FIG. 14 is a view for explaining an example of information which is displayed on the display device in a case where two communication terminals have been detected in the display control system illustrated in FIG. 13. (b) of FIG. 14 is a flowchart showing an example of a display control process executed by the control device illustrated in FIG. 13.

The following description will discuss another embodiment of the present invention with reference to FIGS. 13 and 14. For simplicity of the description, Embodiment 3 will describe only a configuration (process order and process content) differing from those of Embodiments 1 and 2. That is, the configurations and the like described in Embodiments 1 and 2 are all encompassed in Embodiment 3. This also applies to the definitions of terms appearing in Embodiments 1 and 2. A display control system 3 (display control system) in accordance with Embodiment 3 includes communication terminals 20, NFC tags 30, a display device 70, and a control device 80. First, an overview of the control device 80, the display device 70, the communication terminals 20, and the like in the display control system 3 will be described below.

That is, the control device 80 is a control device which is to be connected to a display device 70 (detection device) in which a plurality of NFC antennas 11 (detecting section) are provided on a surface of the display device 70, the plurality of NFC antennas 11 detecting a communication terminal 20 and an NFC tag 30 (detection target) through short range communication with the communication terminal 20 and the NFC tag 30, said control device including: a location obtaining section 43 (obtaining section) for obtaining, from the display device 70, a location of the communication terminal 20 and the NFC tag 30 which have been detected by any of the plurality of NFC antennas 11; a number determining section 61 (number determining section) for determining the number of communication terminals 20 and NFC tags 30 which have been obtained by the location obtaining section 43; and a third process determination section 82 (second executing section) for executing a process associated with the number of the communication terminals 20 and the NFC tags 30 which number has been determined by the number determining section 61.

The control device 80 further includes a file obtaining section 81 (data obtaining section) for obtaining, via the NFC antenna 11, data stored in at least one communication terminal 20 (e.g., communication terminal 20*a*) of a plurality of communication terminals 20 (e.g., communication terminals 20*a* and 20*b*) each of which is the communication terminal 20 (i.e. communication terminal 20*a*) whose number has been determined by the number determining section 61; and the third process determination section 82 transmits, via the NFC antenna 11, information to another communication terminal (i.e., communication terminal 20*b*) which has been detected by the NFC antenna 11 and is other than the at least one communication terminal (i.e., communication terminal 20*a*), the information being used by the another communication terminal (i.e., communication terminal 20*b*) to obtain the data which has been obtained by the file obtaining section 81.

The communication terminal 20 (e.g., communication terminal 20*a*) includes: an NFC-I/F section 21 (NFC communication section); a transmission control section (transmitting section) in the terminal control section 22 for transmitting information from the NFC-I/F section 21 to the control device 80 via a plurality of NFC antennas 11 in a case where the communication terminal 20 and at least one other communication terminal (e.g., communication terminal 20*b*) are placed on the display device 70 (detection device) including the plurality of NFC antennas 11 provided oil a surface of the display device 70, the information being information to be transmitted to the at least one other communication terminal (i.e., communication terminal 20*b*); and a reception control section (receiving section) in the terminal control section 22 for receiving information from the control device 80 via the NFC-I/F section 21 and a plurality of NFC antennas 11 in a case where the communication terminal 20 and at least one other communication terminal (i.e., communication terminal 20*b*) are placed on the display device 70 including the plurality of NFC antennas 11 provided on a surface of the display device 70, the information being used to obtain information held by the at least one other communication terminal (i.e., communication terminal 20*b*).

The display control system 3 is a display control system including: the display device 70 in which a plurality of NFC antennas 11 are provided on a surface of the display device 70, the plurality of NFC antennas 11 detecting a communication terminal 20 and an NFC tag 30 through short range communication with the communication terminal 20 and the NFC tag 30; the control device 80 which is connected with the display device 70; a location obtaining section 43 for obtaining a location of the communication terminal 20 and the NFC tag 30 which have been detected by any of the plurality of NFC antennas 11; a number determining section 61 for determining the number of communication terminals 20 and NFC tags 30 which have been obtained by the location obtaining section 43; and a third process determination section 82 for executing a process associated with the number of communication terminals 20 and NFC tags 30 which number has been determined by the number determining section 61.

A method for controlling the control device 80 is a method for controlling a control device which is to be connected to a display device 70 in which a plurality of NFC antennas 11 are provided on a surface of the display device 70, the plurality of NFC antennas 11 detecting a communication terminal 20 and an NFC tag 30 through short range communication with the communication terminal 20 and the NFC tag 30, the method including: an obtaining step of obtaining, from the display device 70, locations of the communication terminal 20 and the NFC tag 30 which have been detected by any of the plurality of NFC antennas 11; a number determining step of determining the number of communication terminals 20 and NFC tags 30 which have been obtained in the obtaining step; and a second executing step of executing a process associated with the number of communication terminals 20 and NFC tags 30 which number has been determined in the number determining step.

The following description will discuss the display device 70, the communication terminals 20, the NFC tags 30, and the control device 80 in the display control system 3 in more detail with reference to FIG. 13.

FIG. 13 is a block diagram illustrating main configurations of the display device 70, the communication terminals 20, and the control device 80 in the display control system 3 in accordance with Embodiment 3 of the present invention.

The display device 70 includes, instead of the first process executing section 142 of the display device 10, a third process executing section 181. The third process executing section 181 executes, based on instruction information which a second communication section 13 has received from the control device 80, a process instructed in the instruction information.

In comparison with the control device 60, the control device 80 includes the file obtaining section 81 and the third process determination section 82.

The file obtaining section 81 obtains data contained in at least one communication terminal 20 (e.g., communication terminal 20*a*) of a plurality of communication terminals 20 (e.g., communication terminals 20*a* and 20*b*), the file obtaining section 81 obtaining the data from the communication terminal 20 (i.e. communication terminal 20*a*) via an NFC antenna 11, and the number of the communication terminals 20 having been determined by the number determining section 61. Specifically, the file obtaining section 81 first controls the communication section 41 to transmit, to the display device 70, instruction information instructing that "the display device 70 obtains, from the communication terminal 20*a* via an NFC antenna 11, data contained in the communication terminal 20*a*". In response to the instruction information, the display device 70 obtains, from the communication terminal 20*a* via the NFC antenna 11, the data contained in the communication terminal 20*a*. Then, the display device 70 transmits, to the control device 80, the "data contained in the communication terminal 20*a*" which has been obtained via the NFC antenna 11. The file obtaining section 81 obtains the "data contained in the communication terminal 20*a*" from the display device 70 via the communication section 41, and then stores the data in terminal file data 831.

The third process determination section 82 transmits, to the communication terminal 20*b* via the NFC antenna 11, information to be used by the communication terminal 20*b* to obtain the "data contained in the communication terminal 20*a*". Specifically, the third process determination section 82 first controls the communication section 41 to transmit, to the display device 70, instruction information instructing that "the display device 70 transmit, to the communication terminal 20*b*, information necessary for the communication terminal 20*b* to obtain via the NFC antenna 11 the data contained in the communication terminal 20*a*". In response to the instruction information, the display device 70 transmits, to the communication terminal 20*b* via the NFC antenna 11, the "information necessary for the communication terminal 20*b* to obtain via the NFC antenna 11 the data contained in the communication terminal 20*a*". Then, the communication terminal 20*b*, which has received the information from the display device 70 via an NFC-I/F section 21*b*, obtains, via the NFC antenna 11, the data contained in the communication terminal 20*a*. The third process determination section 82 transmits, to the display device 70, data which, for example, has been obtained by the file obtaining section 81 (data contained in the communication terminal 20*a*), and then controls the display device 70 to transmit the data to the communication terminal 20*b* via the NFC antenna 11.

The control device 80 also includes a storage section 83 in which the terminal file data 831 is contained. In the terminal file data 831, data which has been contained in each of the communication terminals 20*a* and 20*b* and which has been obtained by the file obtaining section 81 is stored.

FIG. 14 is a view for explaining a process executed by the display control system 3. (a) of FIG. 14 is a view for explaining an example of information which is displayed on the display section 12 of the display device 70 in a case where two communication terminals 20 (specifically communication terminals 20*a* and 20*b*) have been detected by the display device 70 in the display control system 3. First, the display device 70 detects locations of the communication terminal 20*a* and the communication terminal 20*b* through NFC communication (NFC communication between an NFC antenna 11 and an NFC-I/F section 21*a* of the communication terminal 20*a* and NFC communication between an NFC antenna 11 and an NFC-I/F section 21*b* of the communication terminal 20*b*). Then, the display device 70 notifies the control device 80 of the locations of the communication terminal 20*a* and the communication terminal 20*b* thus detected.

The control device 80 obtains, from the display device 70, locations at respective time points of the communication terminal 20*a* and the communication terminal 20*b* detected by the NFC communication, and, in a case where the display device 70 has determined that the "display device 70 has detected proximity of two or more communication terminals 20", the control device 80 executes the following process.

That is, the control device 80 controls the display device 70 so that the following information is displayed on a region A10 of the display section 12 of the display device 70, on which region A10 neither of the communication terminals 20a and 20b is placed. The control device 80 controls the display device 70 so that the region A10 displays information for assisting the communication terminal 20a and the communication terminal 20b to exchange data which is exchangeable between the communication terminal 20a and the communication terminal 20b.

(b) of FIG. 14 is a flowchart showing an example of a display control process executed by the control device 80. The control device 80 first obtains, from the display device 70, locations at respective time points of the communication terminal 20a and the communication terminal 20b detected through NFC communication with an NFC antenna 11 (S210).

Next, the control device 80 determines whether or not the display device 70 has detected a plurality of communication terminals 20 (S220). In a case where the control device 80 has determined that the plurality of communication terminals 20 have been detected (Yes in S220), for example, in a case where the control device 80 has determined that the communication terminal 20a and the communication terminal 20b have been detected, the control device 80 executes the following process. That is, the control device 80 receives, from each of the detected communication terminals 20a and 20b through NFC communication, information on data which is contained in each of the communication terminals 20a and 20b and which is exchangeable between the communication terminal 20a and the communication terminal 20b (S230). Specifically, the control device 80 controls the display device 70 so that (i) the display device 70 obtains, from the communication terminal 20a via an NFC antenna 11, data contained in the communication terminal 20a and (ii) the display device 70 obtains, from the communication terminal 20b via an NFC antenna 11, data contained in the communication terminal 20b. Then, the control device 80 obtains, from the display device 70, the data contained in each of the communication terminals 20a and 20b, and stores the data in the terminal file data 831.

Then, the control device 80 extracts, with reference to the terminal file data 831, data which is contained in each of the communication terminals 20a and 20b and which is exchangeable between the communication terminal 20a and the communication terminal 20b. Then, the control device 80 controls the display device 70 to display, based on information on the data which is exchangeable, information for assisting the communication terminal 20a and the communication terminal 20b to exchange the data between the communication terminal 20a and the communication terminal 20b (S240).

In a case where the control device 80 has determined that the display device 70 has not detected a plurality of communication terminals 20 (No in S220), the control device 80 finishes the process.

To put it plainly, the control device 80, for example, controls the display section 12 to display data which is not contained in the communication terminal 20b but is contained in the communication terminal 20a. Then, the control device 80 supports the communication terminal 20b to obtain (copies) the data through, for example, NFC communication. Likewise, the control device 80 supports the communication terminal 20a to obtain (copies) data contained in the communication terminal 20b. Alternatively, the control device 80 can control, before data is copied, the display device 70 to display a confirmation message. The control device 80 can support the communication terminal 20a and the communication terminal 20b to exchange items such as: files of Email addresses; image data; video data; music data; coupons; and applications.

(Additional Remarks 7)

Note that in a case where data (exchange-subject data) having a large volume such as images, videos, and music is to be copied (copied and moved) from the communication terminal 20a to the communication terminal 20b or vice versa, a speed of data transmission via an NFC antenna 11 is slow. It is therefore preferable that (i) the communication terminal 20a uploads exchange-subject data to the display device 70 (control device 80) and then (ii) the communication terminal 20b downloads the exchange-subject data from the display device 70 (control device 80). In a case where there is a backup of the exchange-subject data on a cloud server, the exchange-subject data can be downloaded from the cloud server.

[Embodiment 4]

The following description will discuss another embodiment of the present invention with reference to FIGS. 15 through 19. For simplicity of the description, Embodiment 4 will describe only a configuration (process order and process content) differing from those of Embodiments 1 through 3. That is, the configurations and the like described in Embodiments 1 through 3 are all encompassed in Embodiment 4. This also applies to the definitions of terms appearing in Embodiments 1 through 3. A display control system 4 (display control system) in accordance with Embodiment 4 includes communication terminals 20, NFC tags 30, a display device 90, and a control device 100. First, an overview of the control device 100, the display device 90, the communication terminals 20, and the like in the display control system 4 will be described below.

The control device 100 is a control device which is to be connected to the display device 90 (detection device) in which a plurality of NFC antennas 11 (detecting sections) are provided on a surface of the display device 90, the plurality of NFC antennas 11 detecting a communication terminal 20 and an NFC tag 30 (detection target) through short range communication with the communication terminal 20 and the NFC tag 30, the control device including: a location obtaining section 43 (obtaining section) for obtaining, from the display device 90, a location of the NFC tag 30 which has been detected, by any of the plurality of NFC antennas 11, on each of one or more sheets constituting a menu M1 (medium); a display state determining section 101 (identifying section) for identifying a state of the menu M1 on the surface of the display device 90 based on the location of the NFC tag 30 which location has been obtained by the location obtaining section 43; and a fourth process determination section 102 (fourth executing section) for executing a process associated with the state of the menu M1 which state has been identified by the display state determining section 101.

The fourth process determination section 102 of the control device 100 transmits, via the NFC antenna 11, information associated with the state of the menu M1 which state has been identified by the display state determining section 101 to a communication terminal 20 including an NFC-I/F section 21 (NFC communication section) so that the communication terminal 20 displays the information.

The display state determining section 101 of the control device 100 identifies, based on the location of the NFC tag 30 which location has been obtained by the location obtaining section 43, (i) an orientation of the menu M1 on the surface of the display device 90 and (ii) a sheet that is being opened.

The menu M1 (medium) is a medium which is made up of one or more sheets, such that: each of the one or more sheets is provided with an NFC tag 30.

The display control system 4 includes: the display device 90 in which a plurality of NFC antennas 11 are provided on a surface of the display device 90, the plurality of NFC antennas 11 detecting a communication terminal 20 and an NFC tag 30 through short range communication with the communication terminal 20 and the NFC tag 30; the control device 100 which is connected with the display device 90; the location obtaining section 43 for obtaining a location of the NFC tag 30 which has been detected, by any of the plurality of NFC antennas 11, on each of one or more sheets constituting a menu M1; the display state determining section 101 for identifying a state of the menu M1 on the surface of the display device 90 based on the location of the NFC tag 30 which location has been obtained by the location obtaining section 43; and the fourth process determination section 102 for executing a process associated with the state of the menu M1 which state has been identified by the display state determining section 101.

A method for controlling the control device 100 is a method for controlling a control device which is to be connected to display device 90 in which a plurality of NFC antennas 11 are provided on a surface of the display device 90, the plurality of NFC antennas 11 detecting a communication terminal 20 and an NFC tag 30 through short range communication with the communication terminal 20 and the NFC tag 30, the method including: an obtaining step of obtaining, from the display device 90, a location of the NFC tag 30 which has been detected, by any of the plurality of NFC antennas 11, on each of one or more sheets constituting a menu M1; an identifying step of identifying a state of the menu M1 on the surface of the display device 90 based on the location of the NFC tag 30 which location has been obtained in the obtaining step; and a fourth executing step of executing a process associated with the state of the menu M1 which state has been identified in the identifying step.

Figure 15:
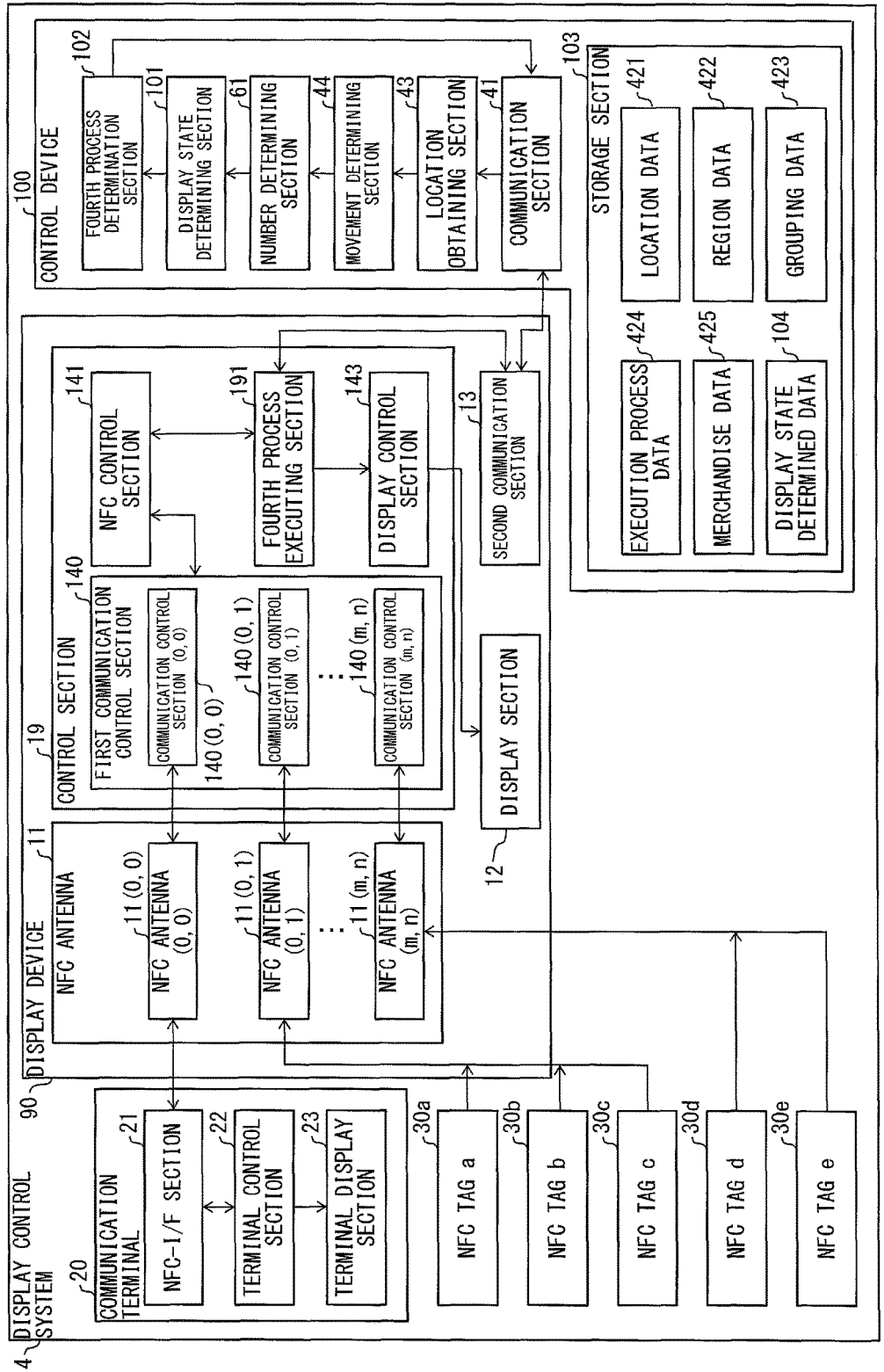
FIG. 15 is a block diagram illustrating main configurations of a display device, communication terminals 20, NFC tags 30, and a control device in a display control system in accordance with Embodiment 4 of the present invention.

The following description will discuss the display device 90, the communication terminals 20, the NFC tags 30, and the control device 100 in the display control system 4 in more detail with reference to FIG. 15.

FIG. 15 is a block diagram illustrating main configurations of the display device 90, the communication terminals 20, the NFC tags 30, and the control device 100 in the display control system 4 in accordance with Embodiment 4 of the present invention. The display device 90 includes, instead of the first process executing section 142 of the display device 10, a fourth process executing section 191. The fourth process executing section 191 executes, based on instruction information which a second communication section 13 has received from the control device 100, a process instructed in the instruction information.

In comparison with the control devices 40, 60, and 80, the control device 100 includes the display state determining section 101, the fourth process determination section 102, and a storage section 103.

The display state determining section 101 refers to display state determined data 104, and identifies a state of a menu M1 based on a location of an NFC tag 30 detected by an NFC antenna 11. Then, the display state determining section 101 notifies the fourth process determination section 102 of the state of the menu M1 thus identified. Details of a process of identifying the state of the menu M1 carried out by the display state determining section 101 will be described later.

The fourth process determination section 102 obtains the state of the menu M1 from the display state determining section 101. Then, the fourth process determination section 102 obtains, with reference to the execution process data 424, a process associated with the state of the menu M1.

The display state determined data 104 is contained in the storage section 103. In the display state determined data 104, detected locations of NFC tags 30 and display states (specifically "opened page" of the menu M1) of the menu M1 are contained while being associated with each other. The NFC tags 30 are provided in the respective sheets of the menu M1. The following description will discuss, with reference to FIG. 16, how the display states of the menu M1 and locations of the NFC tags 30 provided in the respective sheets of the menu M1 are associated with each other.

Figure 16:
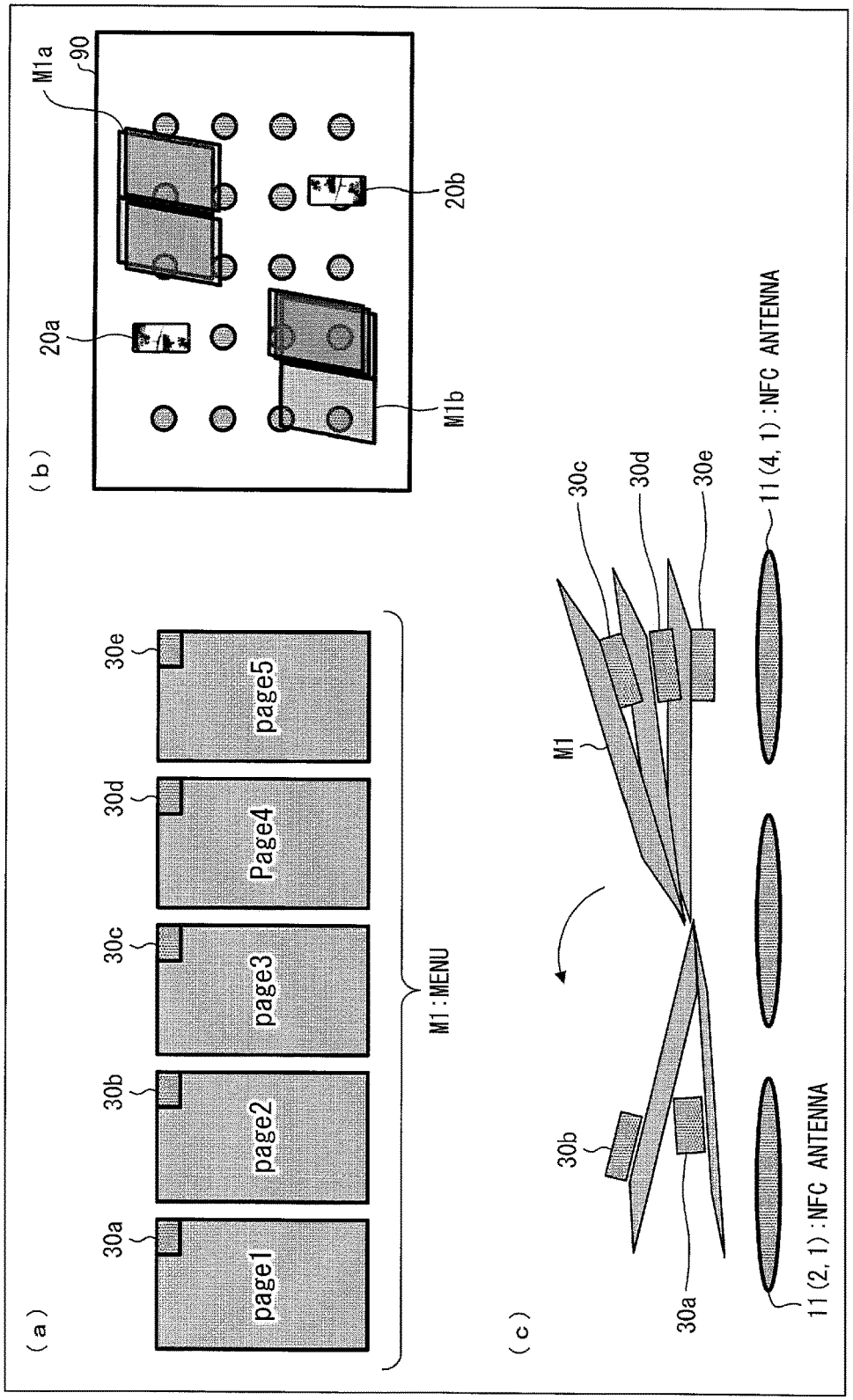
FIG. 16 is a view for explaining a menu and the like on which NFC tags to be detected in the display control system illustrated in FIG. 15 are provided. (a) of FIG. 16 is a view for explaining the menu on which the NFC tags are provided. (b) of FIG. 16 is a view for explaining the menu is placed on the display device so that the display device detects the NFC tags provided on the menu. (c) of FIG. 16 is a view for explaining detected locations of the NFC tags provided on the menu in a case where the menu that is opened is placed on the display device.

FIG. 16 is a view for explaining the menu M1 and the like on which the NFC tags 30 to be detected in the display control system 4 are provided. (a) of FIG. 16 is a view for explaining the menu M1 on which the NFC tags 30 are provided. (b) of FIG. 16 is a view for explaining that the menu M1 is placed on the display section 12 of the display device 90 so that the display device 90 detects the NFC tags 30 provided on the menu M1. (c) of FIG. 16 is a view for explaining detected locations of the NFC tags 30 provided on the menu M1 in a case where the menu M1 is placed on the display section 12 of the display device 90.

As illustrated in (a) of FIG. 16, according to the display control system 4, the NFC tags 30 are attached to the respective pages (respective sheets) of the menu M1. Then, in a case where, for example, any page of the menu M1 is opened and the menu M1 is placed on the display section 12 of the display device 90, the display device 90 detects the NFC tags 30 provided on the menu M1 (see (b) of FIG. 16). That is, depending on what page(s) of the menu M1 is opened, the plurality of NFC antennas 11 detect proximity of the NFC tags 30 provided on each page (each sheet) of the menu M1. (c) of FIG. 16 shows, as an example, a case where the menu M1 including five sheets is placed on the display device 90 while pages between a second sheet (sheet on which the NFC tag 30b is provided) and a third sheet (sheet on which the NFC tag 30c is provided) are opened. In this case, the NFC antenna 11(2,1) detects proximity of the NFC tag 30a provided on a first sheet and of the NFC tag 30b provided on the second sheet. The NFC antenna 11(4,1) detects proximity of the NFC tag 30c provided on a third sheet, of the NFC tag 30d provided on the fourth sheet, and of the NFC tag 30e provided on a fifth sheet.

That is, depending on what page(s) of the menu M1 is opened while the menu M1 is spread on the display section 12 of the display device 90, identification information (NFC identification information) on NFC tags 30 whose proximity is to be detected by the plurality of NFC antennas 11 varies and (ii) the number of the NFC tags 30 varies. That is, in accordance with an NFC antenna 11 of what location detected an NFC tag 30 of what NFC identification information, it is possible to identify the state of the menu M1 such as what page(s) of the menu M1 is being opened. The display state determined data 104 contains information (opened page) on what page(s) of the menu M1 is opened such that the information is associated with (i) a location (location information) of an NFC antenna 11 which has detected proximity of an NFC tag 30 and (ii) identification information (NFC identification information) of the NFC tag 30 whose proximity is detected by the NFC antenna 11. The display state determined data 104 will be described below with reference to FIG. 17.

(Display State Determined Data)

FIG. 17 is a view illustrating an example of the display state determined data 104. The display state determined data 104 illustrated in FIG. 17 shows the display state determined data 104 on the menu M1 exemplified in (c) of FIG. 6. The display state determined data 104 contains (i) the locations (location information) of the NFC antennas 11 which have detected the NFC tags 30, (ii) identification information (NFC identification information) in the NFC tags 30 detected, and (iii) information (opened page) on what pages of the menu M1 are opened. The locations, the identification information, and the information on opened page are associated with each other.

The display state determined data 104 exemplified in FIG. 17 shows that opened pages (displayed pages) are "pages 3 and 4" in a case where (i) the detected location of the NFC tags 30a and 30b is (2,1) and (ii) the detected location of the NFC tags 30c, 30d, and 30e is (4,1). Note that, in a case where the menu M1 includes five sheets as illustrated in (c) of FIG. 6 and an inner sheet (inner side of the first sheet) is considered as "first page", pages between the second sheet and the third sheet of the menu M1 are opened when "pages 3 and 4" are opened. In a case where the NFC antenna 11(2,1) has detected proximity of the NFC tags 30a and 30b and the NFC antenna 11(4,1) has detected proximity of the NFC tags 30c, 30d, and NFC tag 30e, the menu M1 is placed on the display section 12 of the display device 90 while "pages 3 and 4" are opened.

In a case where the control device 100 has been notified that the NFC antenna 11(2,1) had detected the NFC tags 30a and 30b and the NFC antenna 11(4,1) had detected the NFC tags 30c, 30d, and 30e, the control device 100 determines, with reference to the display state determined data 104, that the displayed pages of the menu M1 are "pages 3 and 4".

By determining that the NFC tags 30 have moved (i.e., at least one of change from proximity to non-proximity and change from non-proximity to proximity), the control device 100 determines that a user has turned the pages of the menu M1 (i.e., the pages have been turned). Then, in a case where the control device 100 has determined that the pages had been turned, the control device 100 controls the communication terminal 20 to display information related to a displayed page displayed after the pages are turned.

Note that, in the display state determined data 104, of course, pieces of location information other than "(2,1)" and "(4,1)" are contained such that the pieces of location information are associated with pieces of NFC identification information and opened pages. For example, the display state determined data 104 contains information indicating that opened pages (displayed page) are "pages 5 and 6" in a case where a detected location of the NFC tags 30a, 30b, and 30c is (3,3) and a detected location of the NFC tags 30d and 30e is (5,3). The display state determined data 104 shown in FIG. 17 is merely an example of display state determined data 104.

The display state determined data 104 contains not only displayed pages but also directions (up, down, right, left) in which the menu M1 faces (i.e., orientation of the menu M1) so that the orientations of the menu M1 are associated with pieces of location information and with pieces of NFC identification information. Details of the "orientation of the menu M1" and the like will be described later.

(Process in Accordance with Display State of Menu)

The control device 100 controls the display section 12 to display information which is associated with the display state of the menu M1 (e.g., pages being displayed) and is to be notified to the two users U1a and U1b. The control device 100 also (i) controls the communication terminal 20a to display information which is associated with the display state of the menu M1 and is to be notified only to the user U1a and (ii) controls the communication terminal 20b to display information which is associated with the displayed page(s) of the menu M1 and is to be notified only to the user U1b. Note that contents displayed on the communication terminal 20 preferably vary depending on each user (details will be described later).

For example, in a case where a target calorie intake of the user U1a is 400 kcal and it has been detected that the user U1a had selected a food having 600 kcal, the control device 100 can control the display device 90 so that at least one of the communication terminal 20a and the display device 90 displays the following information. That is, it is possible that at least one of the communication terminals 20 and the display device 90 displays (i) a pop-up asking "Do you wish to place the food in the order tray although the target calorie intake is exceeded by 200 kcal?" and (ii) a button allowing a user to select "to order/not to order". Alternatively, it is possible that in a case where it has been detected that a food having 400 kcal has been selected, at least one of the communication terminals 20 and the display device 90 displays (i) a pop-up asking "The upper limit of the target calorie intake has been reached. If you order another item, the target calorie intake will be exceeded. Is that OK?" and (ii) a button allowing a user to select "to order/not to order". Alternatively, it is possible that in a case where it has been detected that a food having 300 kcal has been selected, at least one of the communication terminals 20 and the display device 90 displays a pop-up showing that "100 kcal until the target calorie intake".

(Other Processes to be Executed in Case where Display State of Menu has Been Detected)

In the example described above, a communication terminal 20 displays personal information (e.g., information on consumed calories of each user) and carries out a payment. Note, however, that processes to be executed by the communication terminal 20 are not limited to these processes. For example, the communication terminal 20 can merely display details of information (e.g., name of food) provided on an opened page of the menu M1.

In the example described above, the communication terminal 20 displays personal information. Note, however, that the control device 100 can control, for example, the display section 12 of the display device 90 to display information, provided that the information is public information such as detailed information in the menu M1. Moreover, for example, in a case where wine has not been ordered although a page of wines on the menu M1 has been opened for longer than a predetermined time period, the control device 100 can execute the following process. That is, the control device 100 can determine that "a user has not been able to decide which wine to order for a long time", and can instruct a store staff to come to assist the user with selection of a wine.

(Arrangement Location of NFC Tags 30)

By devising an arrangement of the NFC tags 30 on (respective pages of) the menu M1, the control device 100 (display device 90) can determine (i) an orientation in which a page of the menu M1 is displayed and (ii) a front side and a back side of a page displayed. An example of arrangement locations of NFC tags 30 for determining a display state of the menu M1 will be described below.

Figure 18:
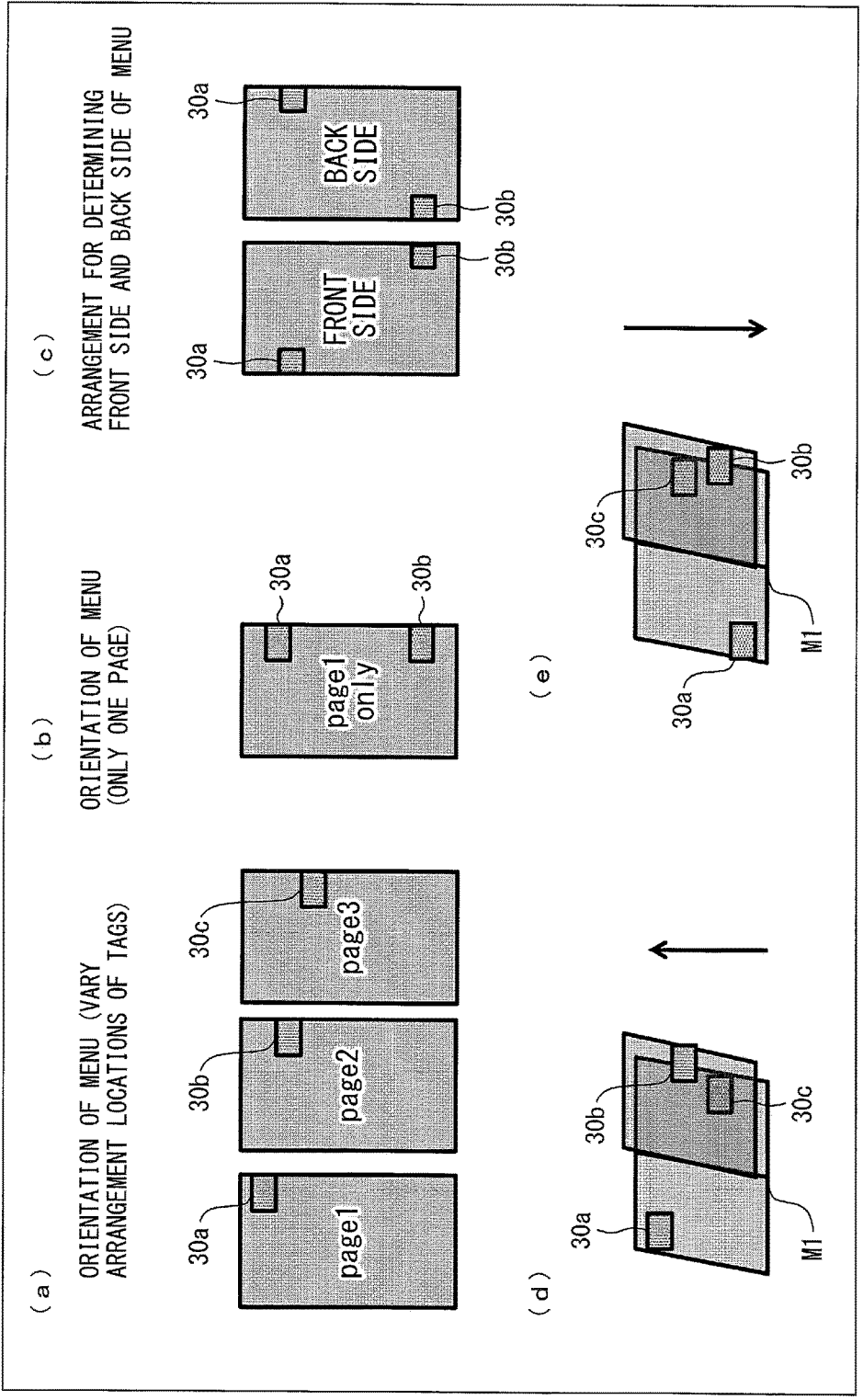
FIG. 18 is a view for explaining an example of an arrangement, on a menu, of NFC tags to be detected in the display control system illustrated in FIG. 15. (a) of FIG. 18 is a view for explaining an example of an arrangement of NFC tags for determining an orientation of a menu including a plurality of pages. (b) of FIG. 18 is a view for explaining an example of an arraignment of NFC tags for determining an orientation of a menu including only one page. (c) of FIG. 18 is a view for explaining an example of an arrangement of NFC tags for determining a front side and a back side of a menu. (d) and (e) of FIG. 18 are views for explaining, by comparison, that locations of NFC tags to be detected vary, depending on an orientation of a menu.

FIG. 18 is a view for explaining an example of an arrangement, on the menu M1, of NFC tags 30 to be detected in the display control system.

(a) of FIG. 18 is a view for explaining an example of an arrangement of NFC tags 30 for determining an orientation of display of the menu M1 including a plurality of pages. In the example in (a) of FIG. 18, the followings vary from each other: (i) an arrangement location of an NFC tag 30a attached to page 1 of the menu M1; (ii) an arrangement location of an NFC tag 30b attached to page 2; and (iii) an arrangement location of an NFC tag 30c attached to page 3. That is, in the menu M1 illustrated in (a) of FIG. 18, the arrangement locations of the NFC tags 30 vary depending on each page. Therefore, based on locations of NFC antennas 11 which have detected proximity of the NFC tags 30a, 30b, and 30c, respectively, the control device 100 can determine the orientation of the menu M1 (orientation in which a page of the menu M1 is displayed).

(b) of FIG. 18 is a view for explaining an example of an arraignment of NFC tags for determining an orientation of a menu including only one page. In the example in (b) of FIG. 18, an NFC tag 30a and an NFC tag 30b are arranged at an upper right part and a lower right part, respectively, of page 1 of the menu M1. Therefore, even in a case where the menu M1 includes only one sheet, the control device 100 can still determine the orientation of the menu M1 (orientation in which a page of the menu M1 is displayed) based on locations of NFC antennas 11 which have detected proximity of the NFC tags 30a and 30b, respectively.

(c) of FIG. 18 is a view for explaining an example of an arrangement of NFC tags 30 for determining a front side and a back side of a menu M1. In the example in (c) of FIG. 18, an NFC tag 30a and an NFC tag 30b are arranged at an upper left part and a lower right part, respectively, of a page of the menu M1 when the page is viewed from the front side. Therefore, the control device 100 can determine the front side and the back side of the menu M1 based on locations of NFC antennas 11 which have detected proximity of the NFC tags 30a and 30b, respectively.

(d) and (e) of FIG. 18 are views for explaining, by comparison, that locations of NFC tags 30 to be detected vary depending on an orientation in which a page of a menu M1 is displayed. That is, while a page of the menu M1 is displayed from bottom to top as illustrated in (d) of FIG. 18, the menu M1 as illustrated in (e) of FIG. 18 displays a page from top to bottom. That is, the menu M1 illustrated in (d) of FIG. 18 and the menu M1 illustrated in (e) of FIG. 18 display the pages in opposite directions. As such, detected locations of NFC tags 30a, 30b, and 30c are opposite between the menu M1 illustrated in (d) of FIG. 18 and the menu M1 illustrated in (e) of FIG. 18.

By determining the orientation in which a page of the menu M1 is displayed and by determining the front side and the back side of the menu M1, the control device 100 can adjust information to be displayed on the display section 12 and the communication terminal 20. In a case where the orientation in which the display section 12 displays information is adjusted according to the orientation in which a page of the menu M1 is displayed, the display section 12 can display the information in an orientation that is natural to a user. In addition, by determining a direction in which the menu M1 faces (direction toward which the menu M1 displays a page), the control device 100 can estimate (a seat of) a user looking at the menu M1. Therefore, the communication terminal 20 of the user looking at the menu M1 can display information related to the menu M1.

Figure 19:
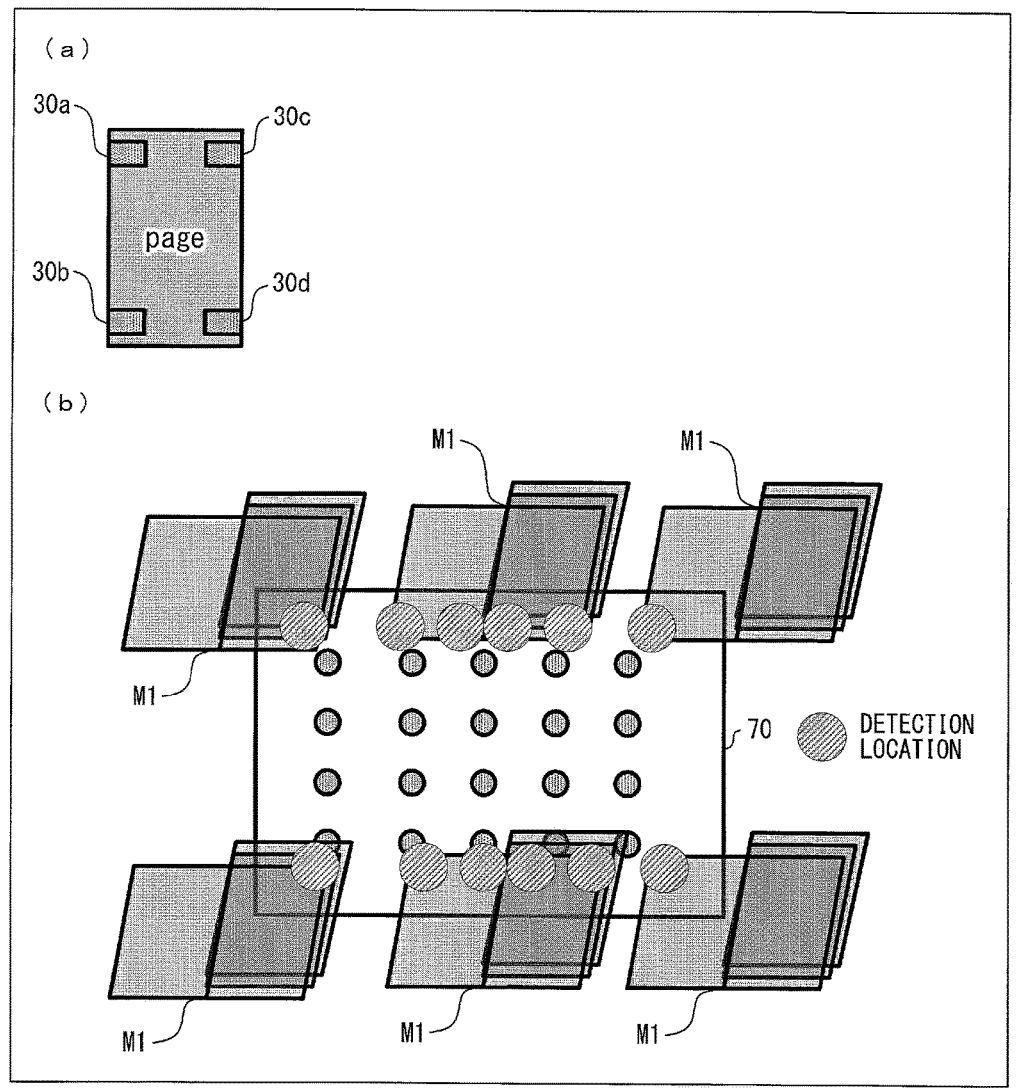
FIG. 19 is a view for explaining that because a plurality of NFC tags are provided on one page of a menu, a display state and the like of the menu can be detected even in a case where the menu is positioned so as to be partially outside a table. (a) of FIG. 19 is a view for explaining that a plurality of NFC tags are provided on one page. (b) of FIG. 19 is a view for explaining that a display device can detect a display state and the like of a menu having a plurality of NFC tags provided on one page of the menu.

FIG. 19 is a view for explaining that a display state and the like of the menu M1 can be detected by providing a plurality of NFC tags 30 on one page of a menu M1, even in a case where the menu M1 is positioned so as to be partially outside a table T1. (a) of FIG. 19 is a view for explaining that a plurality of NFC tags 30 are provided on one page. Specifically, in the example in (a) of FIG. 19, a total of four NFC tags 30, that is, NFC tags 30a, 30b, 30c, and 30d are arranged at respective four corners of a page of the menu M1. (b) of FIG. 19 is a view for explaining that the display device 90 (control device 100) can detect a display state and the like of the menu M1 having a plurality of NFC tags 30 provided on one page of the menu M1.

In a case where the plurality of NFC tags 30 are arranged on one page of the menu M1 as illustrated in (a) of FIG. 19, the control device 100 can determine the display state of the menu M1 even in a case where the menu M1 is partially positioned outside the table T1 as illustrated in (b) of FIG. 19.

[Embodiment 5]

In the display control systems 1 through 4 described above, the following plurality of processes (functions) are separately executed by a plurality of devices. That is, the display devices 10, 50, 70, and 90 execute the function to detect the communication terminal 20 and the NFC tag 30. The control devices 40, 60, 80, and 100 execute the function to determine at least one of a state (e.g., movement) of and the number of pieces of the detected communication terminal 20 and NFC tag 30 or the function to determine states of a piece of tableware to which the detected NFC tag 30 is attached, the menu M1, and the like. The control devices 40, 60, 80, and 100 execute the function to obtain a process associated with at least one of the determined state and the determined number of pieces. The control devices 40, 60, 80, and 100 execute the function to cause an obtained process to be executed. The display device 10 or the communication terminal 20 executes the function to execute an obtained process.

However, the functions can be achieved in one (1) server or device, a plurality of servers or devices having the respective functions can be separately provided, or a plurality of servers can be managed by different providers. For example, it is possible that each of the display devices 10, 50, 70, and 90 executes the functions which are executed by the control devices 40, 60, 80, and 100, in addition to the function to detect the communication terminal 20 and the NFC tag 30.

That is, each of the display devices 10, 50, 70, and 90 in accordance with Embodiment 5 detects the communication terminal 20 and the NFC tag 30. Then, each of the display devices 10, 50, 70, and 90 determines at least one of a state (e.g., movement) of and the number of pieces of the detected communication terminal 20, the detected NFC tag 30, a pieces of tableware on which the NFC tag 30 is arranged, the menu M1, and the like. Subsequently, each of the display devices 10, 50, 70, and 90 obtains a process associated with at least one of the determined state and the determined number of pieces, and executes the process.

[Embodiment 6]

Each of blocks in the display devices 10, 50, 70, and 90, the control devices 40, 60, 80, and 100, and the communication terminal 20 can be realized by a logic circuit (hardware) provided in an integrated circuit (IC chip) or the like or can be alternatively realized by software as executed by a central processing unit (CPU). In the latter case, it is possible to configure each of the display devices 10, 50, 70, and 90, the control devices 40, 60, 80, and 100, and the communication terminal 20 by a computer (electronic calculator) as illustrated in FIG. 20.

Figure 20:
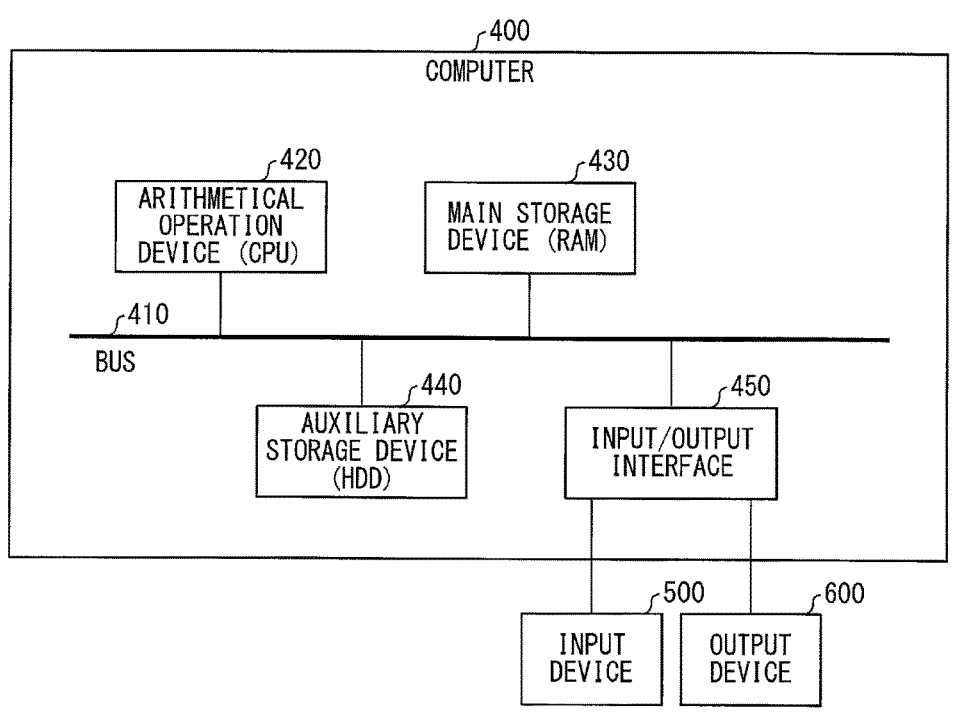
FIG. 20 is a block diagram illustrating an example of a configuration of a computer which can be used as each of the display devices, the control devices, and the communication terminals.

FIG. 20 is a block diagram illustrating an example of a configuration of a computer which can be used as each of the display devices 10, 50, 70, and 90, the control devices 40, 60, 80, and 100, and the communication terminal 20.

As illustrated in FIG. 20, a computer 400 includes an arithmetical operation device 420, a main storage device 430, an auxiliary storage device 440, and an input/output interface 450, which are connected with each other via a bus 410. The arithmetical operation device 420, the main storage device 430, and the auxiliary storage device 440 can be a CPU, a random access memory (RAM), and a hard disk drive, respectively. Note that the main storage device 430 only needs to be a computer-readable "non-transitory tangible medium", and can be configured by, for example, a tape, a disk, a card, a semiconductor memory, a programmable logic circuit, or the like.

The input/output interface 450 is connected with an input device 500 and an output device 600. The input device 500 and the output device 600 in each of the display devices 10, 50, 70, and 90, the control devices 40, 60, 80, and 100, and the communication terminal 20 receive data transmitted from another server or device, and transmit data to another server or device. The input device 500 and the output device 600 in each of the display devices 10, 50, 70, and 90, the control devices 40, 60, 80, and 100, and the communication terminal 20 further obtain input operation by audio, text, or the like from the user, speak to the user, and the like.

The auxiliary storage device 440 stores various kinds of programs for causing the computer 400 to operate as each of the display devices 10, 50, 70, and 90, the control devices 40, 60, 80, and 100, and the communication terminal 20. The arithmetical operation device 420 causes the computer 400 to operate as sections included in each of the display devices 10, 50, 70, and 90, the control devices 40, 60, 80, and 100, and the communication terminal 20 by (i) loading, on the main storage device 430, the programs stored in the auxiliary storage device 440 and (ii) executing instructions included in the programs thus loaded on the main storage device 430.

An example has been discussed above in which the computer 400 is caused to operate by use of the programs stored in the auxiliary storage device 440, which is an internal storage medium. However, it is possible to employ programs stored in an external storage medium. Further, the program may be supplied to the computer via any transmission medium (such as a communication network and a broadcast wave) which enables transmission of the program. Note that the present invention can also be implemented by the program in the form of a computer data signal embedded in a carrier wave which is embodied by electronic transmission.

[Main Points]

The control device (40) in accordance with an aspect 1 of the present invention is a control device which is to be connected to a detection device (display device 10) in which a plurality of detecting sections (NFC antenna 11) are provided on a surface of the detection device, the plurality of detecting sections detecting a detection target (communication terminal 20, NFC tag 30) through short range communication with the detection target, the control device including: an obtaining section (location obtaining section 43) for obtaining, from the detection device, locations at respective time points of the detection target which has been detected by the plurality of detecting sections; a movement determining section (movement determining section 44) for determining, based on the locations at respective time points of the detection target obtained by the obtaining section, whether or not the detection target has moved; and a first executing section (first process determination section 45) for executing a process associated with movement of the detection target in a case where the movement determining section has determined that the detection target had moved.

According to the configuration, the control device determines a state of the detection target, specifically, movement of the detection target which has been detected through short range communication with the detecting section. Further, in a case where the control device has determined that the detection target had moved, the control device executes a process associated with movement of the detection target. That is, the control device can execute the process associated with the state of the detection target.

In the control device in accordance with an aspect 2 of the present invention, it is possible in the aspect 1 that the detection target is at least one of an NFC tag (30) and a communication terminal (20) which includes an NFC communication section (NFC-I/F section 21) and a display section (terminal display section 23); each of the plurality of detecting sections is an NFC antenna (11); and, in a case where the movement determining section has determined that the detection target had moved, the first executing section transmits, via the NFC antenna, information associated with movement of the detection target to the communication terminal so that the communication terminal displays the information, the information corresponding to information which has been received from at least one of the NFC tag and the communication terminal via the NFC antenna.

According to the configuration, the control device determines whether or not the detection target detected by the NFC antenna has moved. Then, in a case where the control device has determined that the detection target had moved, it is possible to transmit, via the NFC antenna, information associated with movement of the detection target to the communication terminal so that the communication terminal displays the information, the information corresponding to information which has been received from at least one of the NFC tag and the communication terminal via the NFC antenna.

The control device (60, 80) in accordance with an aspect 3 of the present invention is a control device which is to be connected to a detection device (display device 50, 70) in which a plurality of detecting sections (NFC antenna 11) are provided on a surface of the detection device, the plurality of detecting sections detecting a detection target (communication terminal 20, NFC tag 30) through short range communication with the detection target, the control device including: an obtaining section (location obtaining section 43) for obtaining, from the detection device, a location of the detection target which has been detected by any of the plurality of detecting sections; a number determining section (number determining section 61) for determining the number of pieces of the detection target which has been obtained by the obtaining section; and a second executing section (second process determination section 62, third process determination section 82) for executing a process associated with the number of pieces of the detection target which number has been determined by the number determining section.

According to the configuration, the control device determines a state of the detection target, specifically, the number of pieces of the detection target which has been detected through short range communication with the detecting section. Further, the control device can execute a process associated with the number of pieces of the detection target, that is, a process associated with the state of the detection target.

In the control device (60) in accordance with an aspect 4 of the present invention, it is possible in the aspect 3 that the detection target is at least one of an NFC tag (30) and a communication terminal (20) which includes an NFC communication section (NFC-I/F section 21) and a display section (terminal display section 23); each of the plurality of detecting sections is an NFC antenna (11); and the second executing section (second process determination section 62) transmits, via the NFC antenna, information associated with the number of pieces of the detection target which number has been determined by the number determining section to the communication terminal so that the communication terminal to displays the information, the information corresponding to information which has been received from at least one of the NFC tag and the communication terminal via the NFC antenna.

According to the configuration, the control device determines the number of pieces of detection target detected by the NFC antenna. Then, the control device can transmit, via the NFC antenna, information associated with the number of pieces of the detection target to the communication terminal so that the communication terminal displays the information, the information corresponding to information which has been received from at least one of the NFC tag and the communication terminal via the NFC antenna.

In the control device (80) in accordance with an aspect 5 of the present invention, it is possible in the aspect 3 that the detection target is a communication terminal (20) which includes an NFC communication section (NFC-I/F section 21) and a display section (terminal display section 23); each of the plurality of detecting sections is an NFC antenna (11); the control device further includes a data obtaining section (file obtaining section 81) for obtaining, via the NFC antenna, data stored in at least one communication terminal of a plurality of communication terminals each of which is the communication terminal whose number has been determined by the number determining section; and the second executing section (third process determination section 82) transmits, via the NFC antenna, information to another communication terminal which has been detected by the detecting section and is other than the at least one communication terminal, the information being used by the another communication terminal to obtain the data which has been obtained by the obtaining section.

According to the configuration, the control device determines the number of pieces of the communication terminal detected by the NFC antenna. Then, in a case where the control device has determined that there is the plurality of communication terminals, the control device obtains, via the NFC antenna, data which is stored in at least one communication terminal of the plurality of communication terminals. Further, the control device transmits, via the NFC antenna, information for the another communication terminal other than the at least one communication terminal to obtain the data to the another communication terminal. As such, the control device can execute a predetermined process for exchanging the data between the plurality of communication terminals detected by the NFC antenna.

The control device (100) in accordance with an aspect 6 of the present invention is a control device which is to be connected to a detection device (display device 90) in which a plurality of detecting sections (NFC antenna 11) are provided on a surface of the detection device, the plurality of detecting sections detecting a detection target (communication terminal 20, NFC tag 30) through short range communication with the detection target, the control device including: an obtaining section (location obtaining section 43) for obtaining, from the detection device, a location of the detection target (NFC tag 30) which has been detected, by any of the plurality of detecting sections, on each of one or more sheets constituting a medium (menu M1); an identifying section (display state determining section 101) for identifying a state of the medium on the surface of the detection device based on the location of the detection target which location has been obtained by the obtaining section; and a fourth executing section (fourth process determination section 102) for executing a process associated with the state of the medium which state has been identified by the identifying section.

According to the configuration, the detection target is arranged on each of the sheets of the medium. The control device identifies a state of the medium based on a location of the detection target which has been detected through short range communication with the detecting section, and executes a process associated with the identified state of the medium. As such, the control device can execute a process associated with a location of the detection target, that is, a process associated with a state of the detection target.

In the control device in accordance with an aspect 7 of the present invention, it is possible in the aspect 6 that the detection target is an NFC tag (30); the detecting section is an NFC antenna (11); and the fourth executing section transmits, via the NFC antenna, information associated with the state of the medium which state has been identified by the identifying section to a communication terminal (20) including an NFC communication section (NFC-I/F section 21) so that the communication terminal displays the information.

According to the configuration, the control device identifies a state of the medium based on a location of the NFC tag detected by the NFC antenna. Then, the control device transmits, via the NFC antenna, information associated with the identified state to the communication terminal (20) including the NFC communication section, and thus can cause the information to be displayed.

In the control device in accordance with an aspect 8 of the present invention, it is possible in the aspect 7 that the identifying section identifies, based on the location of the NFC tag which location has been obtained by the obtaining section, (i) an orientation of the medium on the surface of the detection device and (ii) a sheet that is being opened.

According to the configuration, the control device can identify, based on the location of the NFC tag which has been detected by the NFC antenna, (i) an orientation of the medium on the surface of the detection device and (ii) a sheet that is being opened.

The display device (10, 50, 70, 90) in accordance with an aspect 9 of the present invention includes a display surface (display section 12) and a plurality of NFC antennas (11) which are provided so as to overlap with the display surface, the display device displaying, on the display surface, information received via the plurality of NFC antennas.

According to the configuration, the display device can display, on the display surface, information which has been received via the plurality of NFC antennas that are provided so as to overlap with the display surface.

The communication terminal (20) in accordance with an aspect 10 of the present invention includes an NFC communication section (NFC-I/F section 21) and, in a case where at least one of the communication terminal and a detection target having an NFC tag (30) has moved on a detection device (display device 10) including a plurality of NFC antennas (11) provided on a surface of the detection device, the communication terminal displays information which the NFC communication section has received via the plurality of NFC antennas.

According to the configuration, the communication terminal including the NFC communication section can display information which the NFC communication section has received via the plurality of NFC antennas in a case where at least one of the communication terminal and the detection target having the NFC tag has moved on the detection device including the plurality of NFC antennas.

The communication terminal (20) in accordance with an aspect 11 of the present invention includes an NFC communication section (NFC-I/F section 21) and, in a case where two or more pieces of the communication terminal and/or a detection target having an NFC tag (30) are placed on a detection device (display device 50) including a plurality of NFC antennas (11) provided on a surface of the detection device, the communication terminal displays information which the NFC communication section has received via the plurality of NFC antennas.

According to the configuration, in a case where (i) the communication terminal and at least one detection target having an NFC tag (30) are placed on the detection device including the plurality of NFC antennas or (ii) two or more detection targets each having an NFC tag are placed on the detection device, the communication terminal including the NFC communication section can display information which the NFC communication section has received via the plurality of NFC antennas.

The communication terminal (20) in accordance with an aspect 12 of the present invention includes: an NFC communication section (NFC-I/F section 21); a transmitting section (transmission control section in terminal control section 22) for transmitting information from the NFC communication section to a control device (80) via a plurality of NFC antennas (11) in a case where the communication terminal and at least one other communication terminal are placed on a detection device (display device 70) including the plurality of NFC antennas provided on a surface of the detection device, the information being information to be transmitted to the at least one other communication terminal; and a receiving section (reception control section in terminal control section 22) for receiving information from the control device via the NFC communication section and a plurality of NFC antennas in a case where the communication terminal and at least one other communication terminal are placed on a detection device including the plurality of NFC antennas provided on a surface of the detection device, the information being used to obtain information held by the at least one other communication terminal.

According to the configuration, in a case where the communication terminal and at least one other communication terminal are placed on the detection device including the plurality of NFC antennas, the communication terminal including the NFC communication section transmits, from the NFC communication section to the control device (80) via the plurality of NFC antennas, information to be transmitted to the at least one other communication terminal. Moreover, in a case where the communication terminal and at least one other communication terminal are placed on the detection device, the communication terminal receives, from the control device via the NFC communication section and the plurality of NFC antennas, information which is used to obtain information held by the at least one other communication terminal. Therefore, the communication terminal can exchange information, via the control device, with the at least one other communication terminal which is placed on the detection device together with the communication terminal.

The medium (menu M1) in accordance with an aspect 13 of the present invention is made up of one or more sheets, and each of the one or more sheets is provided with an NFC tag (30).

The display control system (1) in accordance with an aspect 14 of the present invention includes: a detection device (display device 10) in which a plurality of detecting sections (NFC antenna 11) are provided on a surface of the detection device, the plurality of detecting sections detecting a detection target (communication terminal 20, NFC tag 30) through short range communication with the detection target; a control device (40) which is connected with the detection device; an obtaining section (location obtaining section 43) for obtaining locations at respective time points of the detection target which has been detected by the plurality of detecting sections; a movement determining section (movement determining section 44) for determining, based on the locations at respective time points of the detection target obtained by the obtaining section, whether or not the detection target has moved; and a first executing section (first process determination section 45) for executing a process associated with movement of the detection target in a case where the movement determining section has determined that the detection target had moved.

According to the configuration, it is possible to bring about an effect similar to that of the aspect 1.

The display control system (2, 3) in accordance with an aspect 15 of the present invention includes: a detection device (display device 50, 70) in which a plurality of detecting sections (NFC antenna 11) are provided on a surface of the detection device, the plurality of detecting sections detecting a detection target (communication terminal 20, NFC tag 30) through short range communication with the detection target; a control device (60, 80) which is connected with the detection device; an obtaining section (location obtaining section 43) for obtaining a location of the detection target which has been detected by any of the plurality of detecting sections; a number determining section (number determining section 61) for determining the number of pieces of the detection target which has been obtained by the obtaining section; and a second executing section (second process determination section 62, third process determination section 82) for executing a process associated with the number of pieces of the detection target which number has been determined by the number determining section.

According to the configuration, it is possible to bring about an effect similar to that of the aspect 3.

The display control system (4) in accordance with an aspect 16 of the present invention includes: a detection device (display device 90) in which a plurality of detecting sections (NFC antenna 11) are provided on a surface of the detection device, the plurality of detecting sections detecting a detection target (communication terminal 20, NFC tag 30) through short range communication with the detection target; a control device (100) which is connected with the detection device; an obtaining section (location obtaining section 43) for obtaining a location of the detection target (NFC tag 30) which has been detected, by any of the plurality of detecting sections, on each of one or more sheets constituting a medium (menu M1); an identifying section (display state determining section 101) for identifying a state of the medium on the surface of the detection device based on the location of the detection target which location has been obtained by the obtaining section; and a fourth executing section (fourth process determination section 102) for executing a process associated with the state of the medium which state has been identified by the identifying section.

According to the configuration, it is possible to bring about an effect similar to that of the aspect 6.

The control method in accordance with an aspect 17 of the present invention is a method for controlling a control device (40) which is to be connected to a detection device (display device 10) in which a plurality of detecting sections (NFC antenna 11) are provided on a surface of the detection device, the plurality of detecting sections detecting a detection target (communication terminal 20, NFC tag 30) through short range communication with the detection target, the method including: an obtaining step of obtaining, from the detection device, locations at respective time points of the detection target which has been detected by the plurality of detecting sections; a movement determining step of determining, based on the locations at respective time points of the detection target obtained in the obtaining step, whether or not the detection target has moved; and a first executing step of executing a process associated with movement of the detection target in a case where it has been determined in the movement determining step that the detection target had moved.

According to the control method, it is possible to bring about an effect similar to that of the aspect 1.

The control method in accordance with an aspect 18 of the present invention is a method for controlling a control device (60, 80) which is to be connected to a detection device (display device 50, 70) in which a plurality of detecting sections (NFC antenna 11) are provided on a surface of the detection device, the plurality of detecting sections detecting a detection target (communication terminal 20, NFC tag 30) through short range communication with the detection target, the method including: an obtaining step of obtaining, from the detection device, a location of the detection target which has been detected by any of the plurality of detecting sections; a number determining step of determining the number of pieces of the detection target which has been detected in the obtaining step; and a second executing step of executing a process associated with the number of pieces of the detection target which number has been determined in the number determining step.

According to the control method, it is possible to bring about an effect similar to that of the aspect 3.

The control method in accordance with an aspect 19 of the present invention is a method for controlling a control device (100) which is to be connected to a detection device (display device 90) in which a plurality of detecting sections (NFC antenna 11) are provided on a surface of the detection device, the plurality of detecting sections detecting a detection target (communication terminal 20, NFC tag 30) through short range communication with the detection target, the method including: an obtaining step of obtaining, from the detection device, a location of the detection target (NFC tag 30) which has been detected, by any of the plurality of detecting sections, on each of one or more sheets constituting a medium (menu M1); an identifying step of identifying a state of the medium on the surface of the detection device based on the location of the detection target which location has been obtained in the obtaining step; and a fourth executing step of executing a process associated with the state of the medium which state has been identified in the identifying step.

According to the control method, it is possible to bring about an effect similar to that of the aspect 6.

The display device, the control device, and the communication terminal in accordance with the foregoing aspects of the present invention may be realized by a computer. In such a case, the present invention encompasses (i) a control program for the control device, the display device, or the communication terminal which program causes a computer to operate as the foregoing sections of the control device, the display device, or the communication terminal so that the control device, the display device, or the communication terminal can be realized by the computer and (ii) a computer-readable storage medium storing the control program.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining She technical means disclosed in the respective embodiments.

INDUSTRIAL APPLICABILITY

The present invention can be used in a control device to be connected with a detection device.

REFERENCE SIGNS LIST 1, 2, 3, and 4: Display control system
10, 50, 70, and 90: Display device (detection device)
40, 60, 80, 100: Control device
11: NFC antenna (detecting section)
12: Display section (display surface)
20: Communication terminal (detection target)
21: NFC-I/F section (NFC communication section)
22: Terminal control section (transmitting section, receiving section)
23: Terminal display section (display section)
30: NFC tag (detection target)
43: Location obtaining section (obtaining section)
44: Movement determining section (movement determining section)
45: First process determination section (first executing section)
61: Number determining section (number determining section)
62: Second process determination section (second executing section)
81: File obtaining section (data obtaining section)
82: Third process determination section (second executing section)
101: Display state determining section (identifying section)
102: Fourth process determination section (fourth executing section)
M1: Menu (medium)

What is claimed is:

1. A control device which is to be connected to a detection device, the detection device comprising an integrated display device, the display device comprising a surface provided with a plurality of detecting sections, the plurality of detecting sections detecting a detection target through short range communication with the detection target, said control device comprising:

an obtaining section for obtaining, from the detection device, locations at respective time points of the detection target which has been detected by the plurality of detecting sections;

a movement determining section for determining, based on the locations at respective time points of the detection target obtained by the obtaining section, whether or not the detection target has moved; and a first executing section for executing a process associated with movement of the detection target in a case where the movement determining section has determined that the detection target had moved, wherein:

the detection target is at least one of an NFC tag and a communication terminal which includes an NFC communication section and a display section;

each of the plurality of detecting sections is an NFC antenna; and in a case where the movement determining section has determined that the detection target had moved, the first executing section transmits (i), via the NFC antennas, first information associated with movement of the detection target to the communication terminal so that the communication terminal displays the first information, and/or (ii) second information, which is different from the first information, associated with movement of the detection target to the detection device so that the detection device displays the second information, and each of the first information and the second information corresponding to information which has been received from at least one of the NFC tag and the communication terminal via the NFC antennas, wherein the NFC tag being placed on the surface provided with the plurality of detecting sections and being movable on the surface provided with the plurality of detecting sections.

* * * * *